Inventors
Wallace M. Cutler
Lloyd G. Knowles
Charles J. Gross
By their Attorney
Thomas J. Ryan

MACHINES FOR PRESSING SOLES ON SHOES

Filed July 26, 1951 12 Sheets-Sheet 2

Inventors
Wallace M. Cutler
Lloyd G. Knowles
Charles J. Gross
By their Attorney
Thomas J. Ryan Inventors
Wallace M. Cutler
Lloyd G. Knowles
Charles J. Gross
By their Attorney
Thomas J. Ryan Inventors
Wallace M. Cutler
Lloyd G. Knowles
Charles J. Gross
By their Attorney
Thomas J. Ryan

MACHINES FOR PRESSING SOLES ON SHOES

Filed July 26, 1951 12 Sheets-Sheet 5

Inventors
Wallace M. Cutler
Lloyd G. Knowles
Charles J. Gross
By their Attorney
Thomas J. Ryan

MACHINES FOR PRESSING SOLES ON SHOES

Inventors
Wallace M. Cutler
Lloyd G. Knowles
Charles J. Gross
By their Attorney
Thomas J. Ryan Inventors
Wallace M. Cutler
Lloyd G. Knowles
Charles J. Gross
By their Attorney
Thomas J. Ryan

MACHINES FOR PRESSING SOLES ON SHOES

Filed July 26, 1951 12 Sheets-Sheet 8

Inventors:
Wallace M. Cutler
Lloyd G. Knowles
Charles J. Gross
By their Attorney.
Thomas J. Ryan

MACHINES FOR PRESSING SOLES ON SHOES

Inventors
Wallace M. Cutler
Lloyd G. Knowles
Charles J. Gross
By their Attorney
Thomas J. Ryan Inventors
Wallace M. Cutler
Lloyd G. Knowles
Charles J. Gross
By their Attorney
Thomas J. Ryan.

Inventors
Wallace M. Cutler
Lloyd G. Knowles
Charles J. Gross
By their Attorney
Thomas J. Ryan June 7, 1955 W. M. CUTLER ET AL 2,709,823

MACHINES FOR PRESSING SOLES ON SHOES

Filed July 26, 1951 12 Sheets-Sheet 12

Inventors
Wallace M. Cutler
Lloyd G. Knowles
Charles J. Gross
By their Attorney
Thomas J. Ryan United States Patent Office 2,709,823
Patented June 7, 1955

2,709,823

MACHINES FOR PRESSING SOLES ON SHOES

Wallace M. Cutler, Gloucester, Lloyd G. Knowles, Hamilton, and Charles J. Gross, Melrose, Mass., assignors to United Shoe Machinery Corporation, Flemington, N. J., a corporation of New Jersey Application July 26, 1951, Serial No. 238,642

42 Claims. (Cl. 12—37)

This invention relates to machines for applying pressure to shoe bottoms and particularly to machines of the turret type for use in cement attaching soles to shoes.

Objects of the invention are to provide a fluid-pressure-operated machine for this work which is convenient aud safe to operate, which will apply and maintain the pressure required and which will be of moderate cost and long life. Since, with the use of quick-setting cements, a long dwell under pressure is not necessary, only four pads, pad boxes and pressure-applying apparatus are provided, the pads being of the non-inflatable type substantially as disclosed in United States Letters Patent No. 2,205,400, granted June 25, 1940, in the name of Sidney J. Finn, and No. 2,568,065, granted September 18, 1951, in the name of Helge Gulbrandsen.

In the illustrated machine, the shoe and sole are placed right side up upon a pad, and abutments, one for the last and one for the forepart of the shoe, are operated in a vertical direction to press the shoe upon the pad, the abutments remaining at all times in position over the pad. A cylinder and piston are associated with each pad and the cylinder is supplied with oil under pressure to cause the piston to move up. The piston has a flat top on which is a sliding block having a hole therein in which is journaled the central portion of a distributing lever, called herein a "dumbbell," arranged parallel to the longitudinal axis of the pad box. The dumbbell has at each end a spherical portion. Each spherical end portion engages a cylindrical hole in a lever having a fixed fulcrum between its ends, the free ends of the levers being respectively connected to the abutments so that vertical upward movement of the piston will impart downward pressure to the abutments in proportion to the length of the arms of the dumbbell. Since it is generally desirable to impart greater pressure to the abutment engaging the forepart of the shoe than to the abutment engaging the last, the so-called dumbbell may be made with unequal arms, the distance between the central journal and the spherical portion which operates the forepart abutment being shorter than the distance between the central pivot and the spherical end portion which operates the abutment which engages the last. The dumbbell may be reversed end for end, and dumbbells having different ratios may be provided for substitution to obtain various distribution ratios of pressure between the forepart and heel part of the shoe. The cylindrical holes in the levers will accommodate various lengths of arms on the dumbbell.

Pressure fluid for operating the pressure-applying pistons and other mechanism is provided by two rotary pumps on the same shaft driven by an electric motor, the two pumps being connected to a common relief valve set for high pressure (400 to 800 pounds per square inch). One of the pumps, called herein the first pump, will deliver a large volume of oil at varying pressures; the other, or second, pump will deliver a small constant quantity at high pressure. Between the first pump and the common relief valve is a spring-pressed check or relief valve subject to the high pressure from the second pump. Hence the pressure produced by the first pump may equal the pressure of the second pump plus that produced by the spring tension of the check valve. Thus, the pressure of the first pump may exceed momentarily at least the pressure of the second pump by a differential determined by the spring load on the check valve.

A line connected between the first pump and the check valve leads through control valves to the cylinder at the loading station. In this line is a relief valve set for an intermediate pressure (250 pounds per square inch, for example) which is utilized in a fluid-operated motor for indexing the turret. Beyond the common relief valve is a relief valve set for low pressure (150 pounds per square inch, for example) by which movement of the indexing motor is controlled and its reverse movement effected. Thus, oil at three pressures, high, low and intermediate, is available for different purposes as will be explained.

A series of five main valves is provided for controlling the pressure applications, that is, applying pressure, controlling pressure, relieving pressure and indexing the turret. The first valve is herein called a sequence control valve, the second is called a sequence valve, the third is called a pressurizing valve, the fourth is called a dump valve (two stage), and the fifth is called an indexing valve. These are all slide valves of the spool type. The third, fourth and fifth may be manually depressed, and the first and second are automatic, being operated by oil pressure applied at the top and bottom of the valves. The third and fifth are pushed down manually and lifted by oil pressure. The fourth is spring raised. After a shoe is placed on the pad at the loading station, the third or pressurizing valve is moved down by a treadle and admits oil from the first pump to the cylinder at the loading station. As pressure builds up at the loading station, an automatic valve (the sixth) is lifted to admit oil from the second pump at high pressure, only a small quantity being required to build up the pressure from 400 to 800 pounds per square inch since the abutments are then in contact with the shoe and only the yielding of the pad and shoe permit any displacement of the piston by the applied pressure. The relief valve in the line from the first or large volume pump to the common relief valve enables the pressure of the first pump to exceed momentarily that of the second or small volume pump, these pressures being applied to opposite ends of the first valve, the large volume pump being connected to the lower end so that when its pressure exceeds that on the top of the valve it lifts it and admits pressure beneath the third valve (which was treadle depressed) to restore it to initial position. This action cuts out the large volume supply, opens its pump to exhaust and leaves the cylinder under predetermined pressure and still connected to the second pump to prevent any loss of pressure due to leakage should the operator delay indexing of the turret. By means of a manifold the other three cylinders are supplied with pressure from the second pump or constant high-pressure source.

Should the operator, after thus applying pressure to the shoe at the loading station, desire for any reason to relieve that pressure, the fourth or dump valve may be partially depressed by a second treadle, which limited movement dumps the pressure on the cylinder at the loading station and the pressure of the first pump, thus restoring the machine to initial condition.

If the application of pressure to the shoe at the loading station is satisfactory, the fifth or indexing valve is depressed. This valve, until the pressurizing of the loading station was completed, was held up by oil pressure which was exhausted by upward movement of the second valve and can now be readily depressed by operation of a lever. Its depression admits pressure fluid at an intermediate pressure (250 pounds per square inch) to one end of an indexing cylinder the piston of which is connected to the turret, but only if a valve is held open by low pressure on the opposite end of the cylinder to which a constant low fluid pressure (about 150 pounds per square inch) is applied. As the piston advances under high pressure, the turret turns and the exit of low-pressure fluid from the low-pressure end of the cylinder is gradually cut off, bringing the turret to rest without shock and with the next pad at the loading station, the next adjacent pad being exhausted on its way to the loading station.

Mechanism controlled by rotation of the turret acts just as the indexing piston has nearly reached the end of its stroke to release a latch on a spring-pressed valve, allowing it to be moved by its spring to admit fluid from the high-pressure side of the indexing piston to the lower end of the indexing valve to lift it, and simultaneously mechanism controlled by rotation of the turret disconnects the indexing piston from the turret. Lifting of the indexing valve exhausts the high-pressure side of the indexing piston, allowing the lower pressure on the other side to move the piston back to its initial position. This movement of the piston resets the spring-pressed valve in initial position.

In case of emergency or when it is desired to unload the machine completely, the dump valve (fourth) may be fully depressed manually to dump not only the pressure at the loading station but also the pressure on the other three pads and the high-pressure side of the indexing piston, thus stopping the turret. The turret does not move backward because the low-pressure side of the indexing piston is trapped and both pumps are open to exhaust and running idle.

These and other features of novelty and various combinations and arrangements of parts will appear more fully from the following description when read in connection with the accompanying drawings and will be pointed out in the appended claims.

Figures 12, 12A:
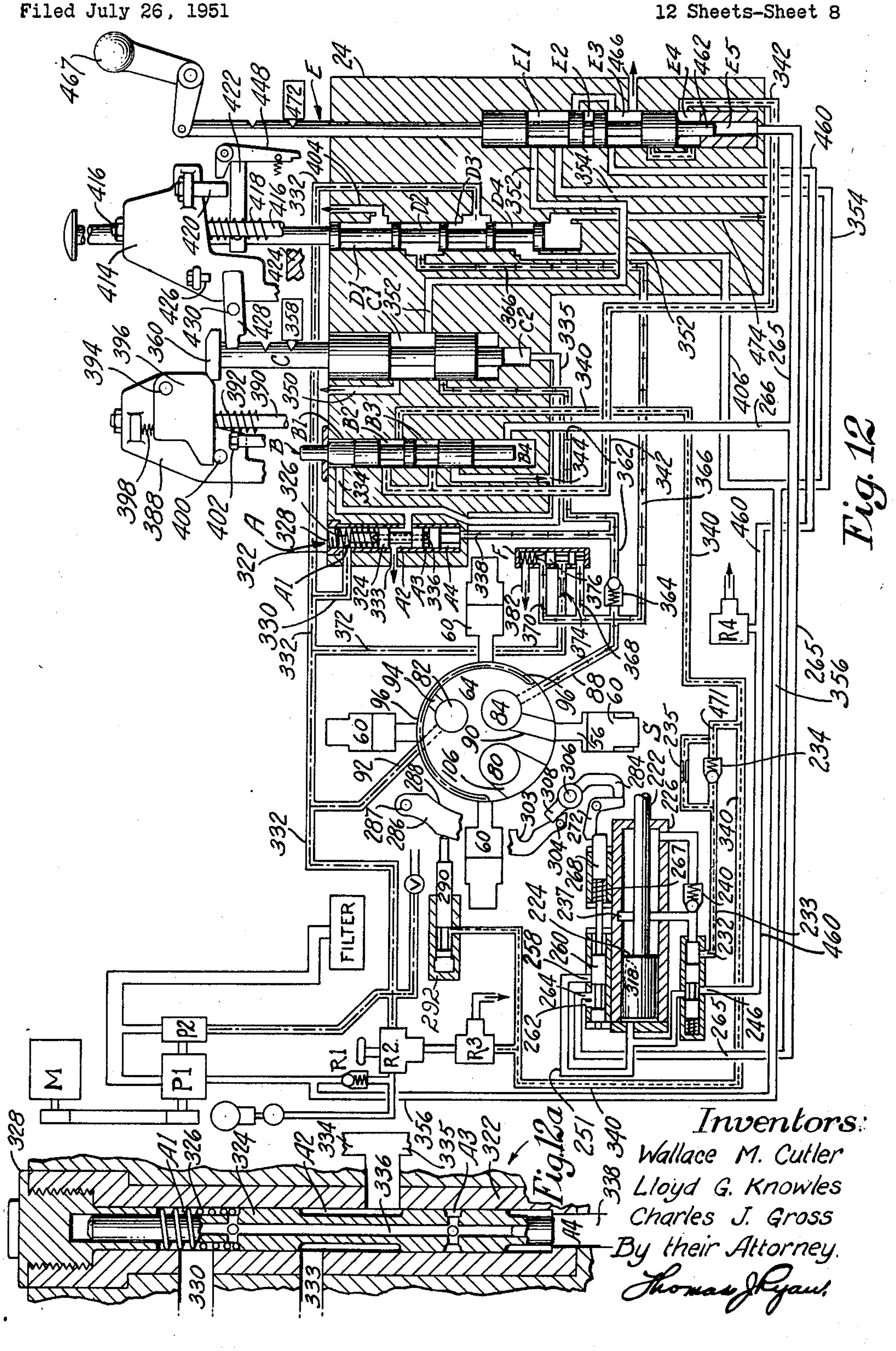
Fig. 12 is a flow chart showing the connections between various fluid-operated devices and the valves by which their operation is controlled, the parts being in their normal or idle position but with the motor running.
Figure 13:
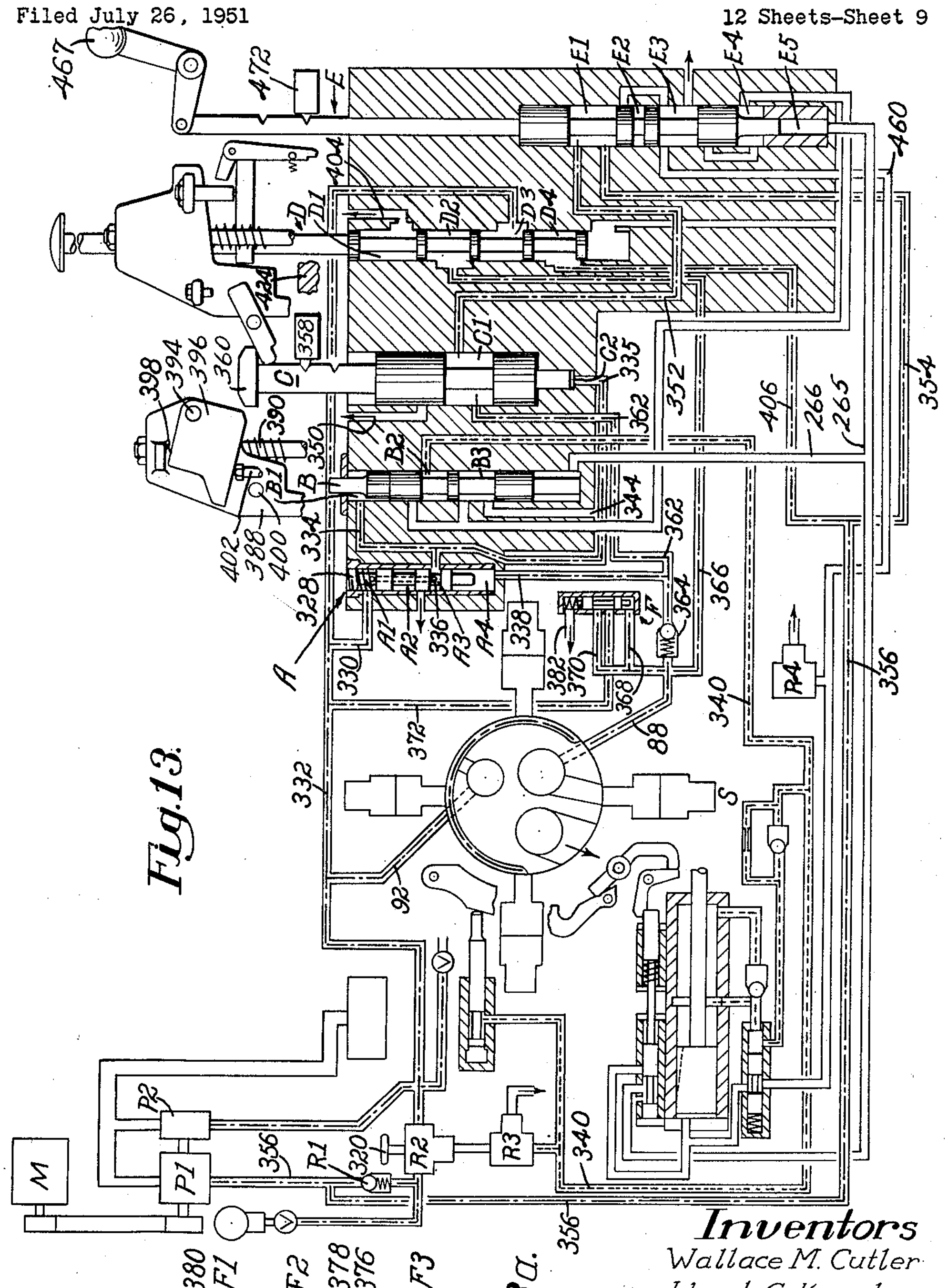
Figure 13A:
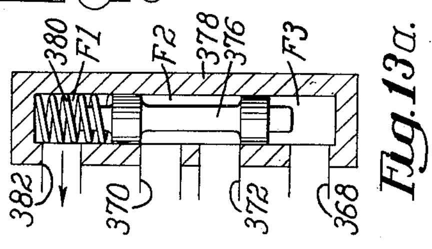
Figure 14:
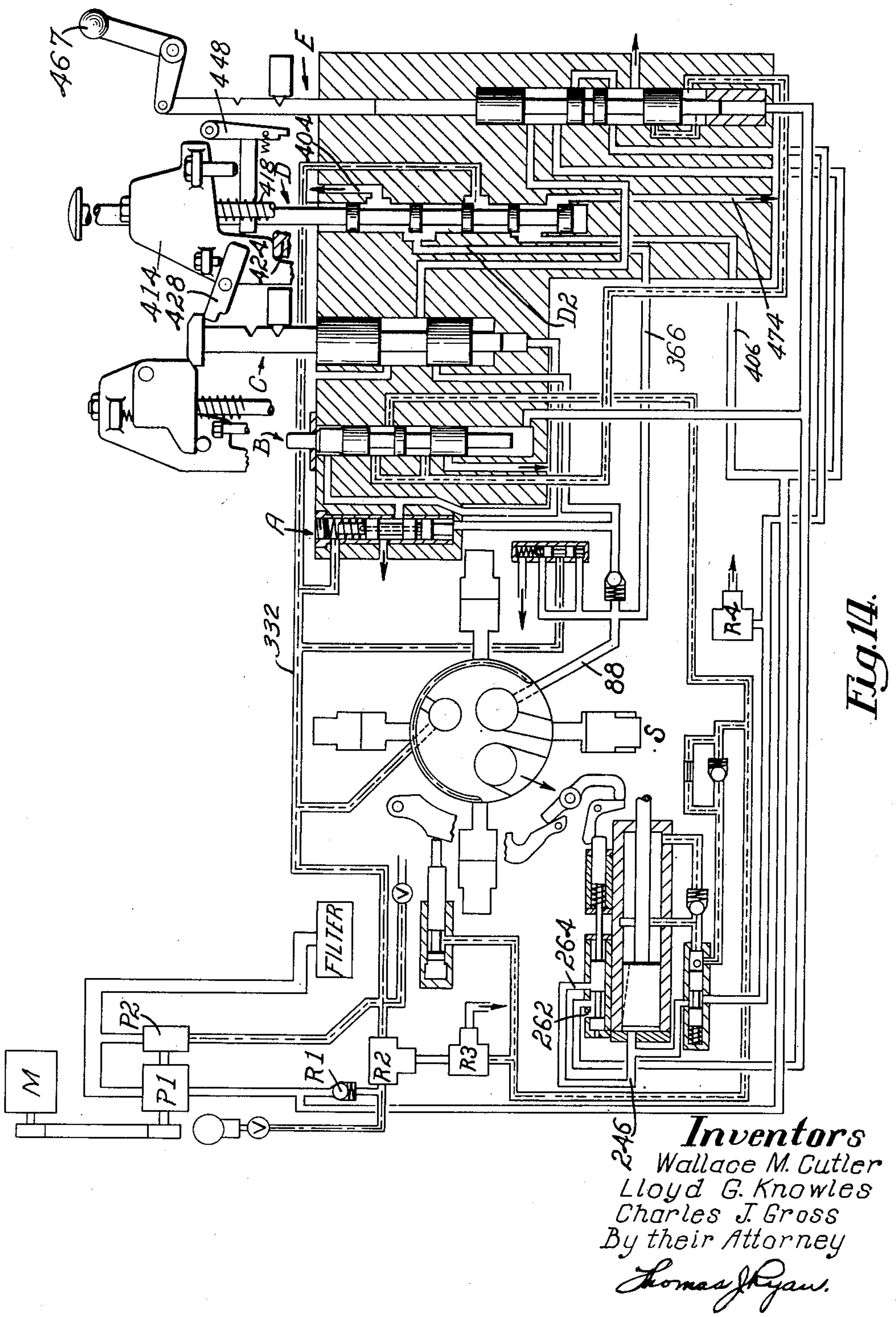
Figure 15:
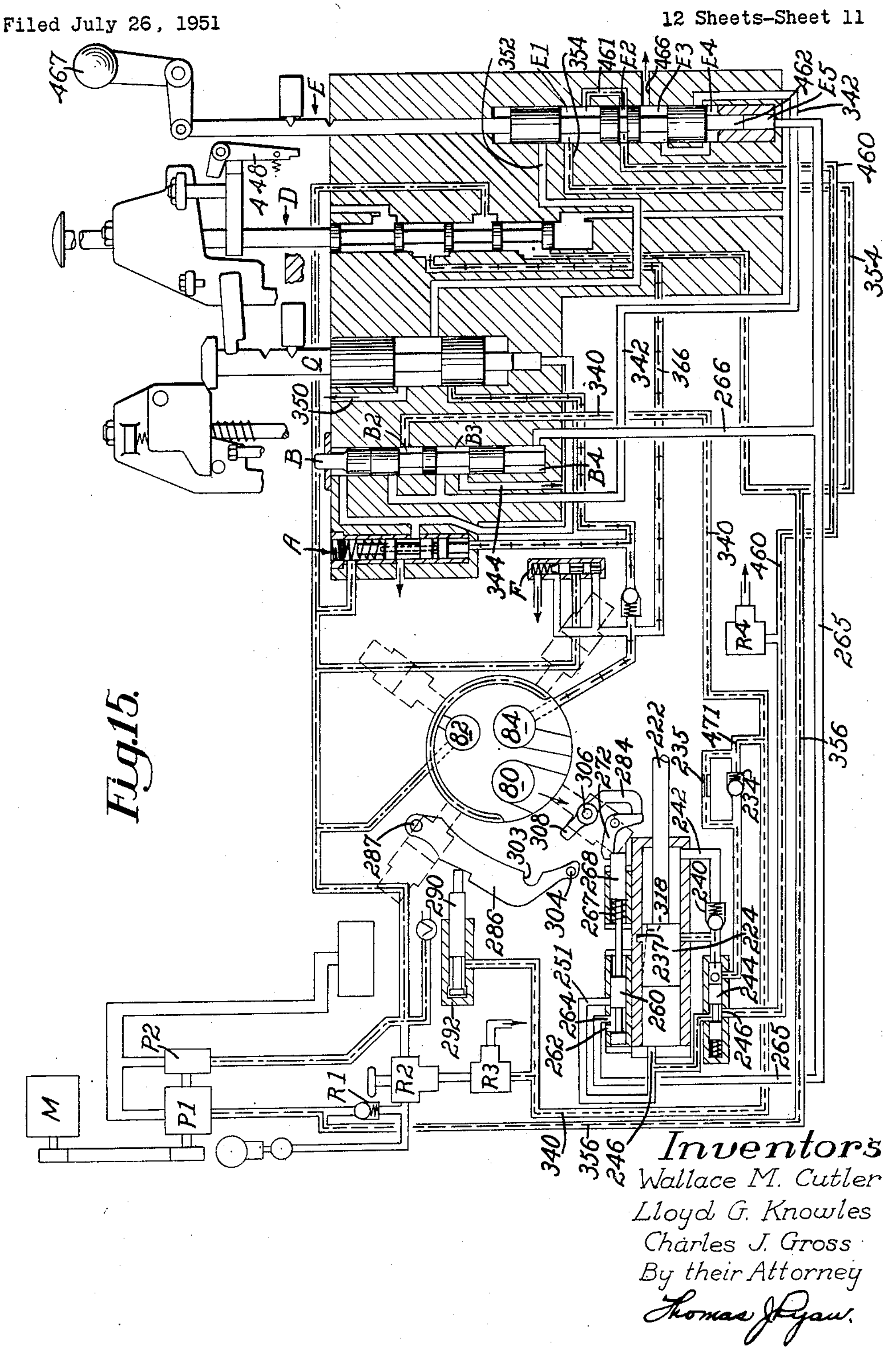
Figure 16:
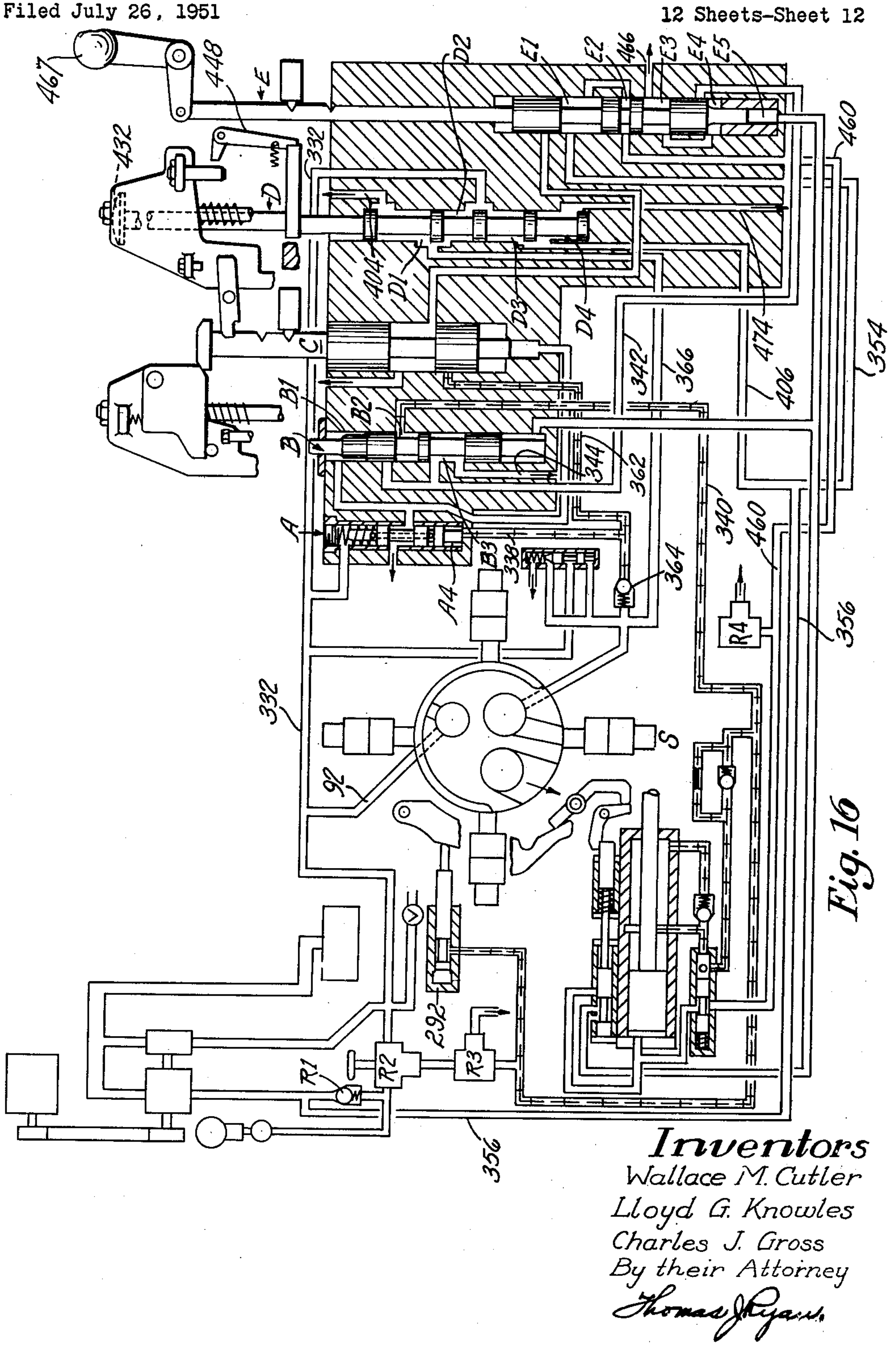

Fig. 12*a* is an enlarged sectional view of a valve shown in Fig. 12;

Fig. 13 is a view similar to Fig. 12 showing conditions after the valve has been operated and just before that valve is returned to initial position;

Fig. 13*a* is an enlarged sectional view of a valve shown in Fig. 13;

Fig. 14 is a view similar to Fig. 12 showing the conditions obtaining when the dump valve has been depressed by a treadle to release the pressure at the loading station;

Fig. 15 is a view similar to Fig. 12 illustrating conditions after the indexing valve has been depressed and the turret turned about 45°; and Fig. 16 is a view similar to Fig. 12 showing the result of complete depression of the dump valve to relieve the pressure at the loading station, in all of the other pressure-applying cylinders and in the indexing cylinder.

Figure 1:
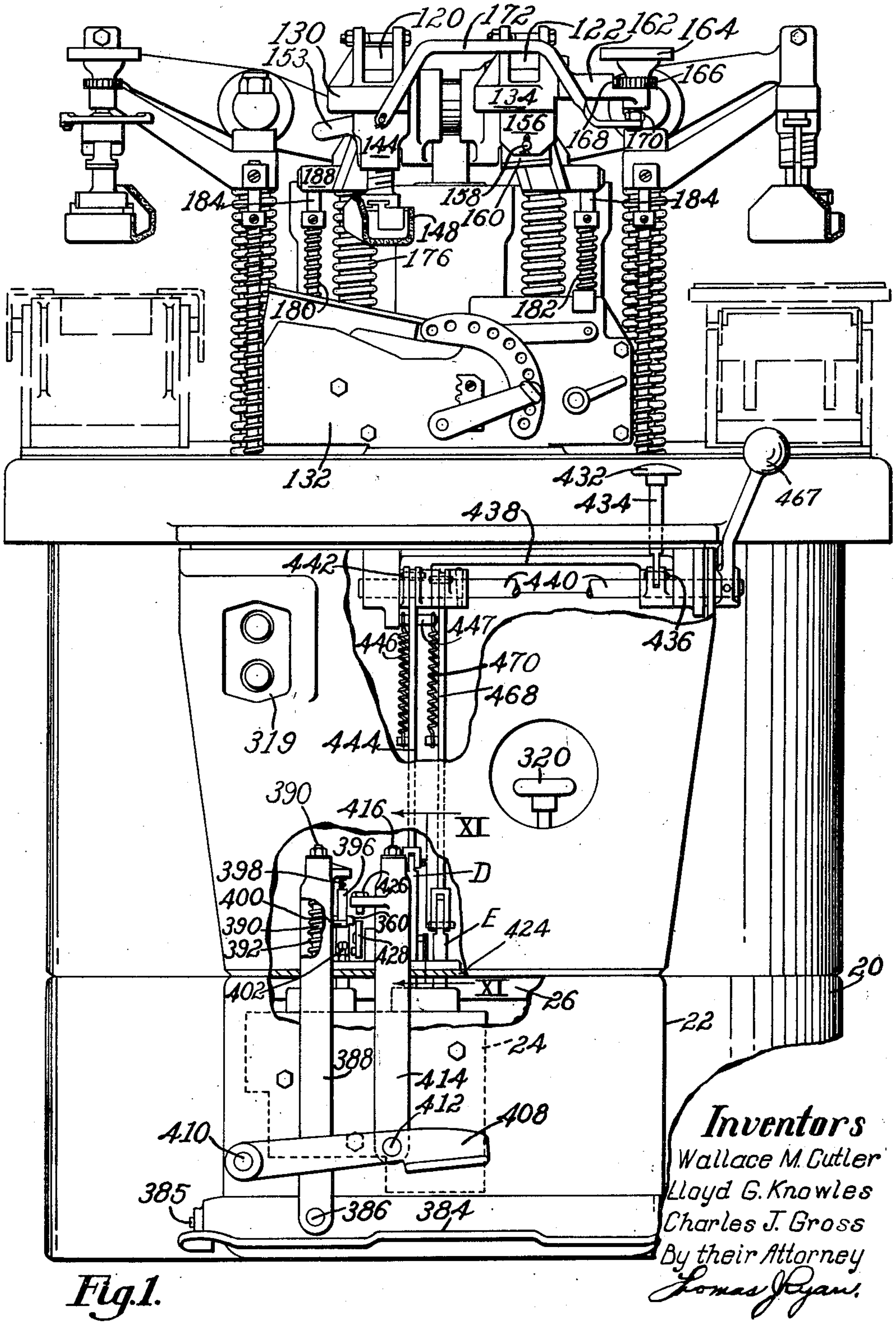
Fig. 1 is a front elevation, with parts broken away, of a machine embodying the present invention.

As illustrated in Fig. 1, the machine has a circular box-like base portion 20 serving as a sump for the oil, the base having a forward projection 22 in which is a block 24 in which five main valves are located. A partial cover 26 (Fig. 2) extends over the top of the base 20 and supports an upright hollow column 28 secured thereto by bolts 29. At the top and near the bottom of the column are fitted ball bearings 30, 32 which are spaced apart by a sleeve 34 down through which extends a vertical hollow shaft 36 on the lower portion of which is threaded a nut 38 between which and the lower bearing 32 is a lock washer 40. The upper bearing 30 is held in place by lugs 42 engaging the bearing and secured to the top of the column by screws 44.

The upper end of the shaft 36 has a head 46 to which is secured by dowels 48 and bolts 50 the central portion 52 of a turret 54. The parts 52, 54 are separately cast for convenience, are fitted together as shown in Fig. 2, and together form a rotatable turret referred to herein as 54.

Equally spaced about the hollow center of the shaft 36 are four vertical ducts 56 each of which communicates with a passage 58 leading into the bottom of one of four pressure-applying cylinders 60. Fitted tightly about the lower end of the shaft 36 and held by bolts 61 is a member 62 into which the ducts 56 are extended and which has a central cylindrical bore into which is fitted with slight tolerance a stationary valve member 64 on which are grooves or surfaces for balancing the oil pressure to permit free rotation of the member 62 about the valve 64. The valve 64 is inserted into the lower end of the finished bore in the member 62 and is then supported and held against rotation by inserting under it a hollow strut 66. The strut has at its upper end parallel rectilinear surfaces 68 engaging corresponding parallel rectilinear surfaces on the lower end of the valve, the strut being slid under the valve member 64 in the direction of the surfaces 68 and held from rotation by engagement of a pin 70 in the bottom of the base with an open notch 71 in a flange 72 on the bottom of the strut, after which a pin 74 is inserted through a hole in the flange 72 and into a corresponding hole in the bottom of the sump where it is held by a clip 76.

Figures 2, 3:
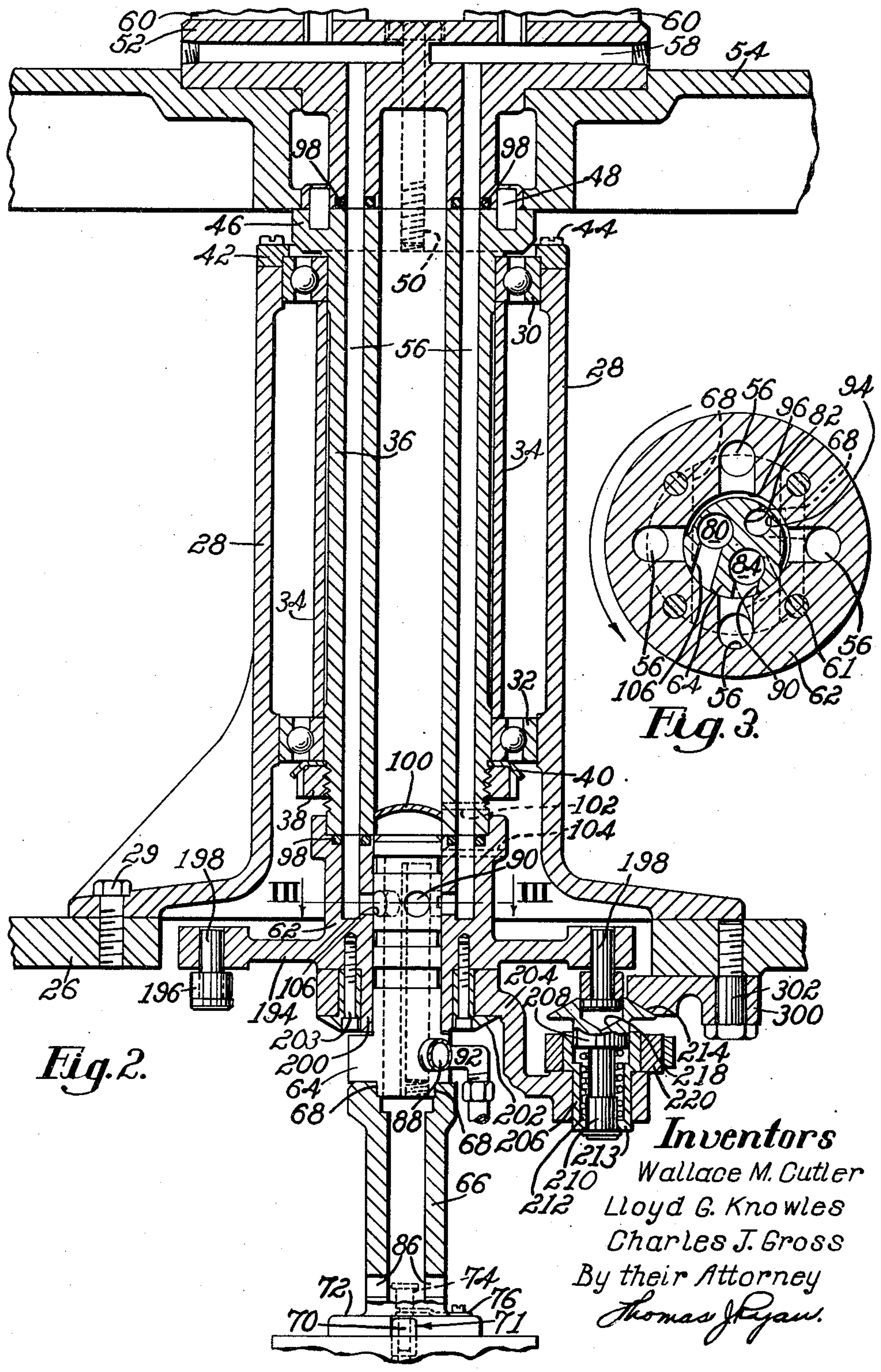
Fig. 2 is a vertical section of the turret and turret-indexing mechanism.
Fig. 3 is a sectional view taken on the line III—III of Fig. 2.

As shown in Fig. 3, the valve member 64 has three longitudinal bores 80, 82 and 84, all being closed at the top and 82 and 84 being plugged at the bottom. 80, being for exhaust, opens at the bottom into the hollow strut 66 which has ports 86 leading into the sump. The bore 84 is connected at the side to a pipe 88 (Fig. 2) through which a large quantity of oil may be forced to that cylinder 60 which is at the loading station the vertical duct 56 of which is opposite a port 90 (Fig. 3) leading from the vertical bore 84.

A pipe 92 (Fig. 2), through which a small quantity of oil at high pressure is supplied, is connected to the vertical bore 82 of the valve member 64 (Fig. 3), the bore having a port 94 connected to a peripheral groove 96 in the valve member which is long enough to communicate at the same time with three of the vertical ducts 56, that is, with all of the ducts except the one at the loading station which is opposite the port 90 in Fig. 3.

At the joint between the portion 52 of the turret and the vertical shaft, O-rings 98 (Fig. 2) are provided to prevent leakage, and leakage from the ducts 56 into the hollow of the shaft 36 is caught by a diaphragm 100 and drained into the sump through an opening 102. Leakage around the valve member 64 passes down into the sump or through a drain hole 104 below the diaphragm 100.

The arrangement above described enables full pressure to be maintained at all times on three of the cylinders 60 during rotation of the turret in the direction of the arrow (Fig. 3). When the turret has rotated 45°, the duct 56 at the left of Fig. 3 connects with a port 106 leading to the exhaust bore 80 in the valve member 64, each cylinder being thereby exhausted on its way to the loading station.

Figure 4:
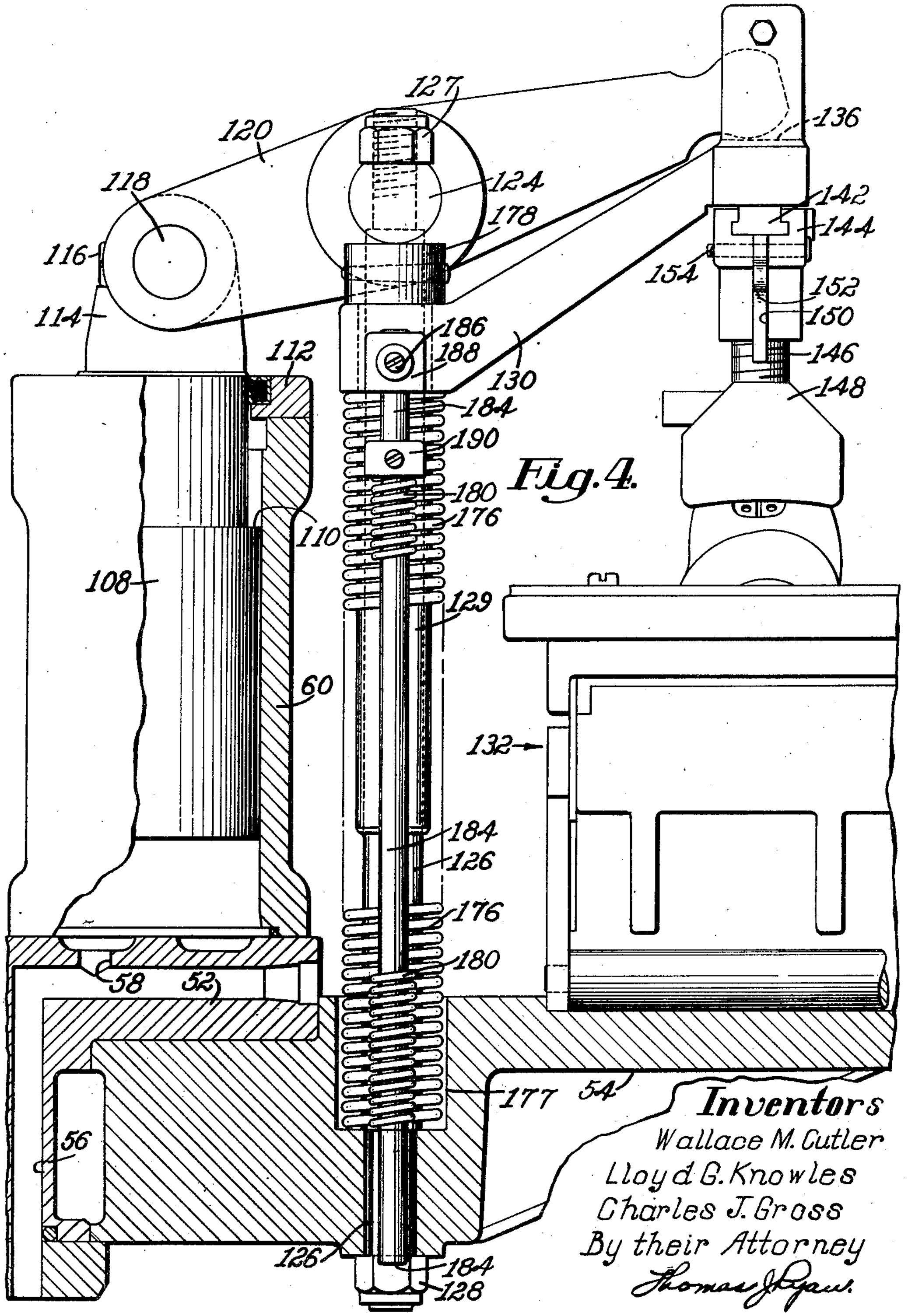
Fig. 4 is a side elevation, partly in section, of one of the fluid-pressure-operated means for applying pressure to shoes in its inactive position.
Figure 6:
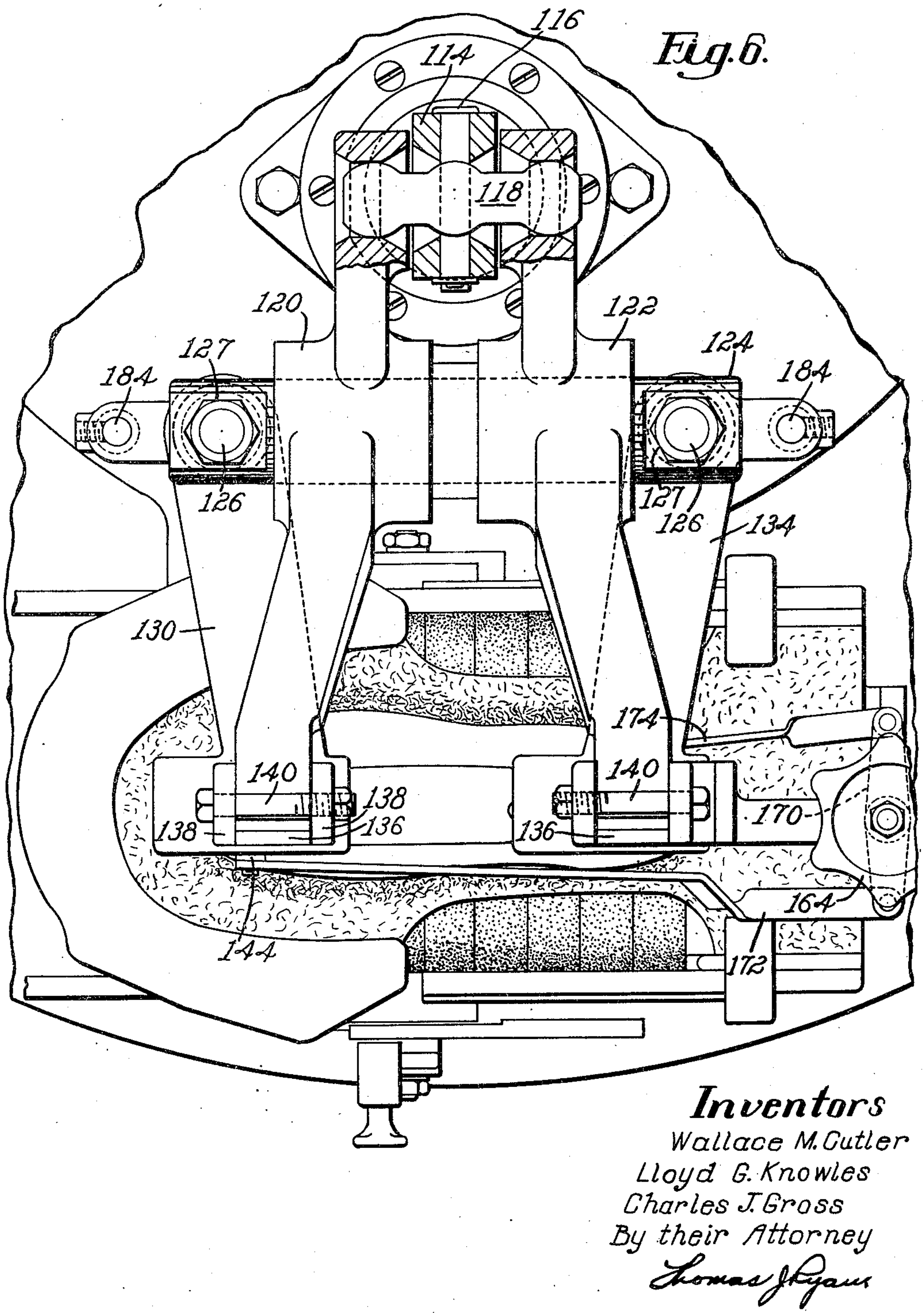
Fig. 6 is a plan view, partly in section, of one of the pads and pressure-applying devices.

Each of the four cylinders 60 is like that shown in Fig. 4. In each cylinder is a piston 108 the upper portion of which is reduced in diameter, forming a ledge 110 which engages a cap 112 secured to the upper end of the cylinder to limit its upward movement. The top of the piston 108 is flat and on it rests a block 114 having a hole therein in which is journaled by a pin 116 a lever 118 herein called a "dumbbell" because its ends are spherically rounded (Fig. 6). One end of each dumbbell 118 enters a substantially cylindrical hole in a pressure-applying lever 120 and the other end engages a similar hole in a pressure-applying lever 122. The dumbbell 118 may have arms of different lengths. Both levers 120, 122 are fulcrumed between their ends on a shaft 124 the ends of which are supported by rods 126 (Fig. 4) the upper ends of which are reduced and pass through the shaft 124 and are held thereon by nuts 127 engaging flat places on the shaft. The lower end portion of each rod is reduced in size and passes through the turret 54 where it is held by a nut 128. Slidingly mounted on each rod 126 is a sleeve 129 from the upper end of one of which an arm 130 projects over the toe end of a pad box 132. From the other sleeve 129 an arm 134 (Fig. 6) extends over the rear end of the pad box 132. The forward arms of the pressure-applying levers 120, 122 diverge and have their ends located one over the arm 130 and the other over the arm 134. The forward ends of the pressure-applying levers 120, 122 are cylindrically shaped, one resting on a flat upper surface 136 of the arm 130 and the other on a similar surface on the arm 134. Upstanding from the surface 136 is a pair of ears 138 through which a bolt 140 is passed to insure upward movement of the arm 130 and sleeve 129 with the forward end of the lever 120. A similar arrangement connects the arm 134 with the lever 122. On the lower side of the arm 130 is a T-guide 142 (Fig. 4) upon which a block 144 is mounted for movement lengthwise of the pad box 132, and threaded into the block is the vertical stem 146 of a toe abutment or rest 148. The stem 146 is provided with a vertical groove 150 which is engaged by a latch 152 pivoted at 154 to the block 144. The latch 152 has a handle 153 (Fig. 1) by which it may be swung out of engagement with the groove 150 to permit turning of the stem 146 to adjust the toe rest 148 up and down. Engagement of the latch with the groove insures proper orientation of the toe rest with respect to the pad box 132. A block 156 (Fig. 1) is mounted on the arm 134 similarly to the block 144 and has pivoted thereto at 158 a last abutment 160.

On the arm 134 is a projection 162 extending rearwardly of the pad box (Fig. 1) in which is vertically journaled a hand-wheel 164 carrying a toothed wheel 166 engaged by a spring detent 168. The intermediate portion of a lever 170 (Fig. 6) is secured to the lower end of the shaft of the hand-wheel 164, and pivoted to one end of the lever 170 is a link 172 connected to the toe rest block 144. Pivoted to the other end of the lever is a link 174 connected to the heel abutment block 156 (Fig. 1). Thus, by rotating the hand wheel 164 the toe rest and last abutment may be moved toward and from each other according to the size of the shoe.

Figure 5:
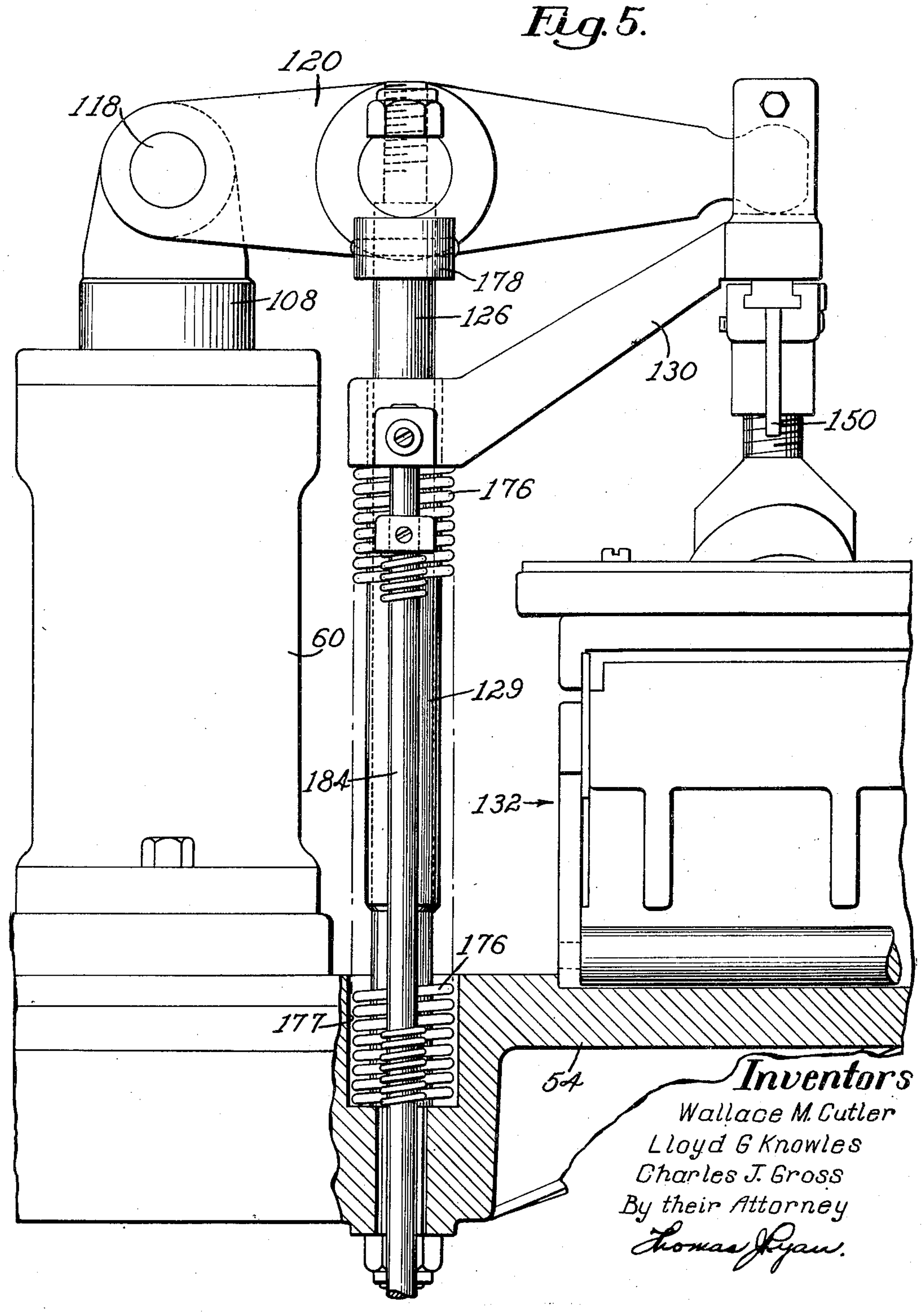
Fig. 5 is a side elevation of mechanism shown in Fig. 4 with the parts in their pressure-applying position.

Fig. 5 shows the described mechanism in pressure-applying position and Fig. 4 the same in released position. Upon release of pressure in the cylinder 60, springs 176 react to lift the arms 130, 134 and hence the front ends of the levers 120, 122, the upward movement of the arms being limited by collars 178 fixed to the rods 126. Each spring 176 surrounds one of the sleeves 129 with its upper end engaging one of the arms 130 or 134 and its lower end engaging the bottom of a recess 177 in the turret 54. Expansion of the springs 176 lifts the abutments 148, 160 from the shoe and pushes the piston 108 down until the arms 130, 134 engage the collars 178. If no shoe is on the pad, the shoulders 110 of the pistons engage the caps 112 which take the thrust of the pistons without injury to the machine.

If the dumbbell 118 has equal arms, the abutments 148, 160 in the construction described, would when pressure is being applied, descend together. If the arms of the dumbbell are unequal, one of the abutments would descend ahead of the other. It is desirable, whether the arms of the dumbbell are equal or not, to be able to set the machine so that either the toe abutment or the last abutment will descend ahead of the other. For this purpose auxiliary springs 180, 182 are provided. A vertical rod 184 (Fig. 4) is secured by a screw 186 in an extension 188 of the arm 130. On the rod is an adjustable collar 190 and the rod extends down freely through a hole in the turret, the spring 180 being located on the rod between the collar 190 and the bottom of the recess 177 in the turret. Similarly connected to the arm 134 is another rod 184 on which is a spring 182. By adjusting the collars 190 up or down the tension of the springs 180, 182 may be varied to add more or less to the action of either of the springs 176 and hence cause either the toe abutment or the last abutment to descend first.

The above-described pressure-applying mechanism is duplicated at each of the four stations of the turret and each of the four pad boxes may be as disclosed in the patents above referred to, but, of course, any suitable pad and box may be used.

Indexing of the turret is effected by mechanism shown in Figs. 2 and 7 to 10. As shown in Fig. 2, the member 62 has four arms 194 at right angles to each other and each carries a roll 196 on a stud 198 having a head of the same size as the roll. The member 62 has a cylindrical downward extension 200 on which is a flanged sleeve 202 held to the member 62 by screws 203. On the sleeve between its flange and the member 62 is mounted for free rotation an arm 204 on the free end of which is means for coupling it to any one of the studs 198.

The coupling means comprises a sleeve member 206 of two diameters, its portion of smaller diameter being rotatably fitted in a hole in the end of the arm 204. The portion of the sleeve of larger diameter receives slidingly a flanged cylindrical member 208 having a stem 210 smaller than the smaller diameter of the sleeve 206 so that a compression spring 212 can be located between the cylindrical member 208 and an inwardly extending flange 213 on the sleeve 206, the spring surrounding the stem 210. The stem passes down through the sleeve and has on its lower end means such as a cotter pin for limiting its upward movement in response to the spring 212. The upper face of a flange 214 of the cylindrical member 208 is downwardly and outwardly inclined and has in its center a hole or cup 218 corresponding in diameter to the heads of the studs 198. When, therefore, the arm is swung about the axis of the turret to engage one of the studs, the inclined surface of the flange 214 will engage the stud, and the member 208 will be depressed against the spring 212 until the hole or cup 218 coincides with the head of the stud when the member 208 will snap up to engage the stud so that movement of the arm will turn the turret.

To operate the arm 204 (Fig. 2) a block 220 is rotatably mounted on the portion of larger diameter of the sleeve 206, the block being connected to a piston rod 222 (Fig. 8) secured to a long piston 224 in a cylinder 226. The cylinder has a fixed pivot 228 allowing it to swing as the piston rod operates the arm 204. The cylinder has a substantially oil-tight head 230 through which the piston rod extends.

Figures 7, 8:
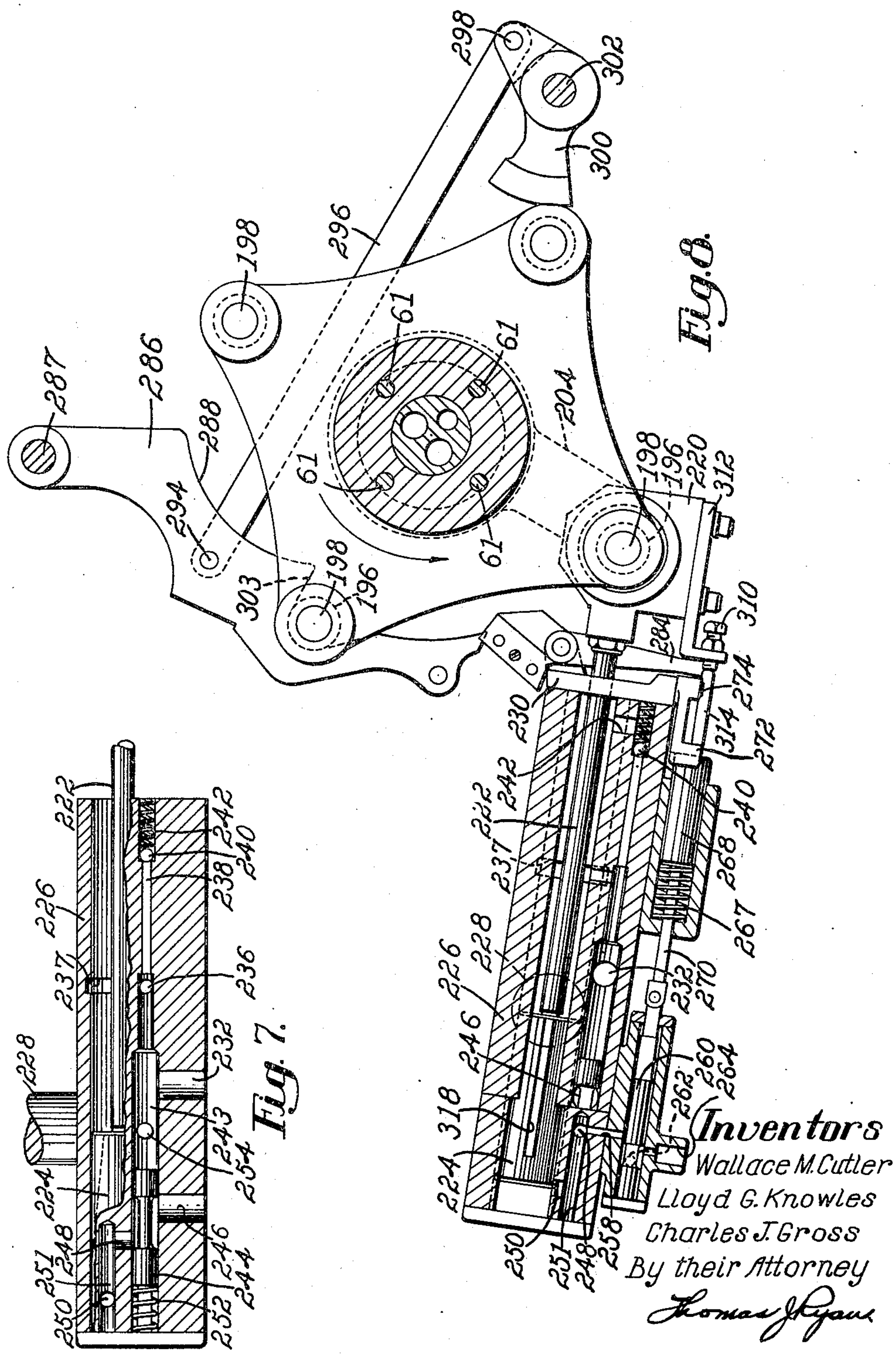
Fig. 7 is a sectional view of the indexing cylinder.
Fig. 8 is a plan view, partly in section, of the turret-indexing mechanism.
Figures 9, 10, 11:
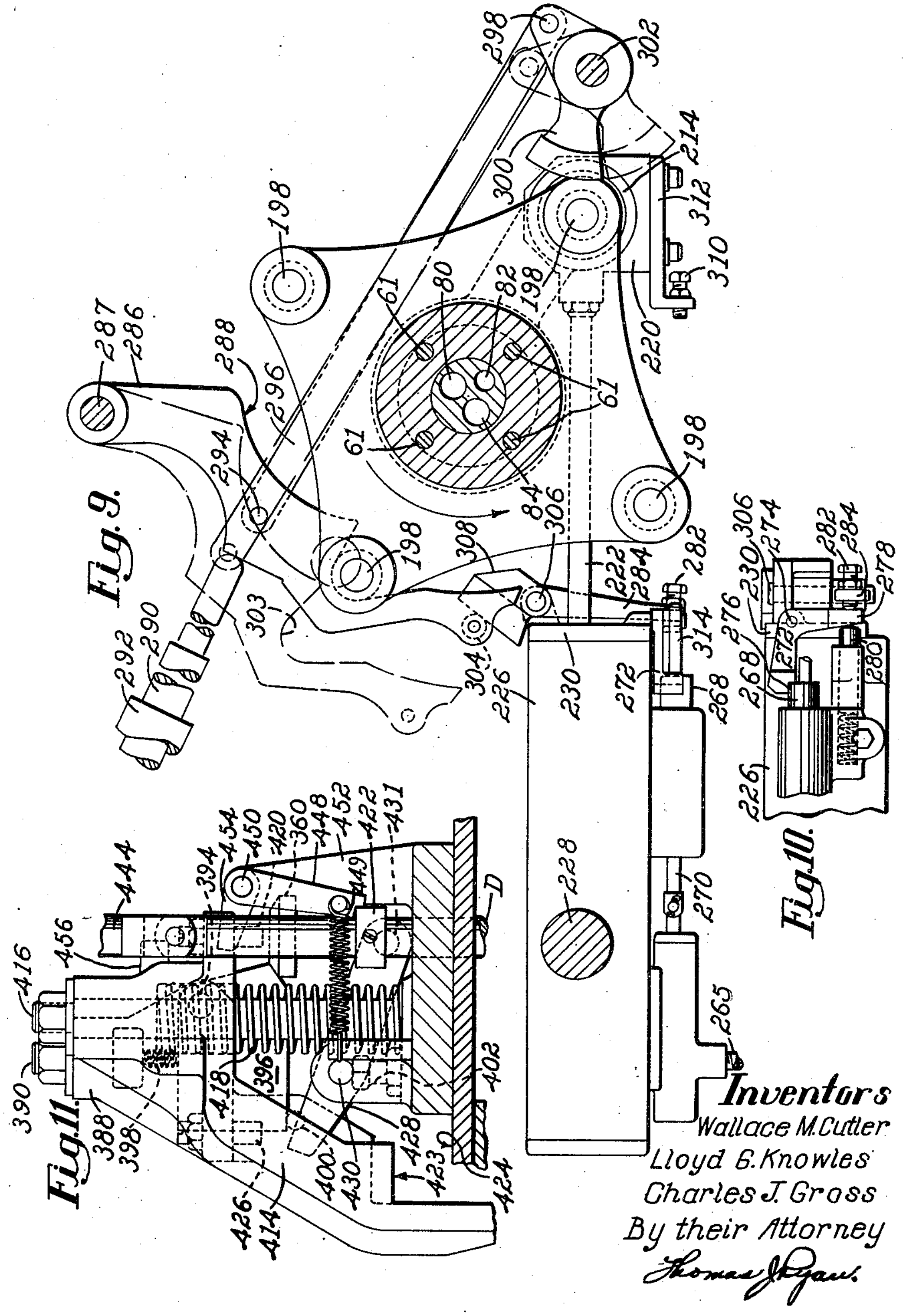
Fig. 9 is a plan view of the indexing mechanism with the parts in the position they assume at the end of the indexing operation.
Fig. 10 is a side elevation of parts shown in Fig. 9.
Fig. 11 is a side elevation of valve-operating mechanism shown in Fig. 1.

Formed in the cylinder wall are the ducts shown in Fig. 7. Low pressure is supplied to a port 232 by a pipe 233 (Fig. 12) in which is a check valve 234 around which is a restricted by-pass 235. The port 232 leads to a port 236 (Fig. 7) connected to a groove 237 formed in the wall of the cylinder 226 and to a duct 238 in which is a check valve 240 beyond which is a port 242 leading to the right-hand end of the cylinder. Pressure applied to the port 232, therefore, normally holds the piston 224 at the limit of its leftwise movement. Beyond the port 232 is an enlarged duct 243 in which is a sliding spool valve 244 which, in the position shown (Fig. 7), will admit high pressure to the left-hand end of the cylinder through ports 246, 248 and 250, the two latter ports being connected by a duct 251. When there is no pressure being applied through the port 232, a spring 252 moves the valve 244 against a pin 254 and closes the port 248. Therefore, unless low pressure is being supplied on the right end of the piston, high pressure cannot be applied on its left end. Thus, sudden actuation of the piston and turret by high pressure, which would be dangerous, is avoided and operation of the turret can take place only when there is opposing low pressure on the other end of the piston to control its movement.

Operation of the machine is controlled by five main valves designated generally by A, B, C, D, and E (Fig. 12). A is a sequence control valve, B is a sequence valve, C is a pressurizing valve, D is a dump valve, and E is an indexing valve. These valves are all mounted in the valve block 24 at the front of the machine, as indicated in Fig. 1.

Admission of high pressure on the left side of the piston 224 through the port 246 is controlled by the indexing valve E, to be described, and its exhaust is controlled by mechanism shown in Fig. 8 where a port 258 from the duct 251 leads to a slide valve 260 which, in its normal position as shown, blocks exit of fluid from the cylinder through duct 251 either through an exhaust port 262 or a port 264 connected by a pipe 265 to the lower end of the valve E and by a branch pipe 266 to valve B. The valve 260 is urged toward the right by a spring 267 acting on a plunger 268 connected by a link 270 to the valve 260. The plunger is held against the action of the spring by a latch 272 (Fig. 10) pivoted at 274 to the head 230 of the cylinder 226. The latch has a notch 276 engaging the plunger 268 and a depending tail 278 upon which a spring plunger 280 acts to hold the latch in position and on which an adjusting screw 282 in a lever 284 acts opposite to the plunger 280 to release the latch 272 to allow the spring 267 to move the valve 260 first to close the exhaust port 262 and then to connect the duct 251 from the left end of the indexing cylinder with the port 264 and pipe 265 to provide a shot of pressure from the indexing cylinder to lift the indexing valve E which exhausts the high pressure on the left end of the piston, thus permitting low-pressure fluid on the right end of the piston to return the piston rod and cause it to become connected to another stud 198. The shot of pressure also passes through the pipe 266 to lift valve B.

Since, as shown in Fig. 2, the piston rod 222 is connected by the flanged cylindrical member 208 to one of the studs 198 on the turret, movement of the piston 224 will turn the turret when pressure fluid is admitted to the port 246. After the turret has been turned 90° the member 208 is released from the stud 198 and the latch 272 released to exhaust the pressure fluid by mechanism shown in Fig. 9. A lever 286 fulcrumed at 287 on the cover 26 has a cam-shaped edge 288 presented to the rolls 196 on the studs 198 on the turret. A piston 290 in a cylinder 292 is subjected to the same pressure as that on the right end of the piston 224 to hold the edge 288 against the roll 196 as the turret turns. The piston 290 engages the lever 286 to which is pivoted at 294 a link 296 connected at its other end by a pivot 298 to a rotary cam 300 pivoted at 302 to the cover 26 (Fig. 2). At the beginning of an indexing movement the parts are in the position shown in Fig. 8 where one of the rolls 196 has just passed a radial drop 303 in the cam edge 288. As the piston 224 is operated to turn the turret in the direction of the arrow, the next roll 196 on the turret will engage the cam edge 288 and move the lever 286 to the dash-line position in Fig. 9 at about the end of its movement and the rotary cam 300 will assume the dash-line position in that figure. When one of the rolls 196 reaches the radial drop 303 of the lever edge 288, the lever will return to the full-line position and two things happen. The rotary cam 300, in assuming its full-line position, engages the inclined flange 214 of the spring-pressed cylindrical member 208 and depresses it to release it from the stud 198, and a roll 304 on the lever 286, toward which the cylinder 226 has swung on its pivot 228 during the indexing movement, will engage the lever 284 pivoted at 306 to an ear on the head 230 of the cylinder and having an arm 308 which at that time is in the path of the roll 304. Engagement of the roll 304 with the lever 284, 308 will trip the latch 272 and the valve 260 will be shifted by the spring 267 to admit the high pressure which is moving the piston 224 beneath the valves B and E to lift them, thus causing exhaust of the pressure fluid at the left end of the piston. The constant pressure at the right end of the piston will then act, through the restricted by-pass 235 around the check valve 234, to swing the arm 204 (Fig. 8) slowly back to its initial position and cause the flange 214 (Fig. 2) to engage the next stud on the turret, the flange being thus depressed and the spring lifting the flange when the hole 218 coincides with the stud to connect the arm 204 with the stud. Reverse movement of the turret during this action is prevented by engagement of the next roll 196 with the radial drop 303. During return (leftward) movement of the piston 224, a screw 310 (Fig. 8) on an angle plate 312 secured to the block 220 on the piston rod engages a rod 314 projecting from the plunger 268 and pushes it back against the spring 267 until the latch 272 (Fig. 10) again drops to hold the valve 260 in initial position.

The rate of movement of the indexing piston 224 is fast for about half of its stroke, the high pressure on its left end pushing the low-pressure oil on its right end back into the line through the groove 237 and the check valve 234 since the fluid cannot pass through the port 242 because of the check valve 240. After the groove is covered by movement of the piston, the only escape for the low-pressure fluid is through a narrow slit 318 (Fig. 8) made in the piston which is deep at the right end and gradually of less depth, fading out near the left end of the piston so that at about the end of its stroke the shallow end of the slit 318 passes just beyond the groove 237 and the piston stops, further movement, if any, being due to leakage by the piston.

As shown in Fig. 12, power is supplied by an electric motor M controlled by a switch 319 (Fig. 1) and connected by a belt to the shaft of a double pump P1, P2 (Fig. 12) such as that designated V-108YC and supplied by Vickers, Incorporated, of Detroit, Michigan. The two pumps P1, P2 are vane pumps on the same shaft. P1 can deliver a large quantity of oil at pressures up to and exceeding that of P2 by reason of a spring-loaded relief valve R1. P2 delivers constantly a small quantity at high pressure. The various pressures are controlled by three relief valves R2, R3 and R4 made by the above-mentioned manufacturer and having designation C167BK. R2 is set for pressures from 400 to 800 pounds per square inch, and is common to the two pumps. The relief valve R1 is subject to the pressure of P2 and is loaded with a spring so that P1 has to overcome the pressure due to P2 plus that of the spring before it is relieved. Thus R1 gives the pressure produced by P1 a differential over the pressure produced by P2. R3 is set for a pressure of about 150 pounds per square inch and R4 for a pressure of about 250 pounds per square inch. Adjustment of the relief valve R2 to control the pressure of P1 and P2 is effected by a hand-wheel 320 shown in Fig. 1. R3 supplies low pressure for the piston 290, and for retracting the indexing piston. R4 supplies higher pressure for operating the indexing piston in opposition to the pressure of R3. Fig. 12 illustrates diagrammatically conditions with the motor running and the machine at rest. High pressure is supplied by P2 to maintain pressure in all the cylinders 60 except that at the loading station.

The construction of the five main valves A, B, C, D and E is best shown in the diagrammatic Figs. 12 et seq. The first or sequence control valve A, shown enlarged in Fig. 12*a*, comprises a removable sleeve 322 in which is mounted a sliding spool 324 on top of which is a spring 326 held by a plug 328. The spring chamber A1 is connected to a pipe 330 leading to a high-pressure line 332 from P2. Below the chamber A1 is a chamber A2 connected to an exhaust port 333 and by a duct 334 to the top of the valve B. From duct 334 a duct 335 leads to the bottom of valve C. A chamber A3 has a duct 336 leading to chamber A1. The bottom chamber A4 of the valve is connected to a line 338, pressure in which in excess of that in chamber A1 lifts the valve A, closing the exhaust port 333 and connecting the pressure fluid in chamber A1 with the ducts 334, 335 to depress valve B and lift valve C.

The sequence valve B has its top chamber B1 connected to duct 334 as stated. Its chamber B2 connects a pressure duct 340 to a duct 342 leading to the chamber E4 near the bottom of the indexing valve E to hold the indexing valve E against depression. Valve B, when depressed by pressure in B1, cuts off the pressure duct 340 and opens line 342 to exhaust duct 344. Chamber B4 is connected by the pipe 266 to the line 265 (shown exhausted in Fig. 12) leading to chamber E5 of valve E.

The pressurizing valve C has a chamber C1 connecting, in Fig. 12, an exhaust duct 350 with a pressure line 352 leading to E1 and thence by ducts 354, 356 to pump P1. Valve C has at its lower end a small stem fitting the chamber C2 to reduce the upward pressure on it from the duct 335. Valve C is held yieldingly in raised or lowered position by a spring detent 358 engaging notches in its upper portion which is surmounted by a head 360. When depressed the valve C connects, through its chamber C1, the pressure line 352 with a line 362 leading through a check valve 364 to the line 88 connected through the turret valve 64 to the cylinder 60 at the loading station. Branching from the line 88 is a line 366 leading to chamber D2 of the dump valve D. A line 368 leads to the bottom of a valve F and a line 370 leads to the top of the valve F. Between the lines 368 and 370 a pressure line 372 having a restricted passage 374 leads from pump P2 into the valve chamber F2. The valve F consists (Fig. 13*a*) of a spool 376 sliding in a casing 378 held down by a spring 380 in a chamber F1 from which there is a vent 382. When the valve F is held down by its spring 380, there is a very small opening from the line 370 into the spring chamber F1. This opening vents at 382 any pressure that might build up in the cylinder 60 at the loading station, due to leakage, while the machine is standing idle with the motor running. When raised by pressure in chamber F3 from lines 88, 368, the chamber F2 connects the line 370 to the high-pressure line 372 to augment the pressure in the cylinder 60 at the loading station S. The spring 380 is such that the pressure of fluid from P1 rises to within about 50 pounds per square inch of the pressure of P2 before the valve shifts upward to connect line 372 with line 370.

The pressurizing valve C is depressed by stepping on a long treadle 384 (Fig. 1) pivoted at 385 and connected at 386 to an upright member 388 which slides loosely on a rod 390 and is upheld by a spring 392.

Pivoted to the member 388 (Figs. 11 and 12) at 394 is a plate 396 which normally lies over the edge of the head 360 of the pressurizing valve C, being held by a spring 398 against a stop pin 400 on the member 388. As the treadle 384 is depressed, the plate 396 engages the head 360 and depresses the valve C to its lower position to be held there yieldingly by the detent 358, whereupon the plate 396 engages a fixed stop 402 and is deflected against the spring 398 away from the head 360 to permit raising of valve C by other means if the treadle 384 is held depressed.

The dump valve D (Fig. 12) has four chambers: D1 is normally exhausted through duct 404; D2 stops the line 366 connected to the line 88 leading to the cylinder 60 at the loading station; D3 stops the high-pressure line 332 from P2; and D4 stops the pressure line 406 leading from line 356 from P1. Partial depression of valve D (Fig. 14) opens line 366 to exhaust duct 404, thus releasing any pressure in the cylinder 60 at the loading station. To save unnecessary load on P1 the line 406 therefrom is also exhausted through D4 and exhaust duct 474. The dump valve is partially depressed for this purpose by a treadle 408 (Fig. 1) pivoted at 410 and connected at 412 to an upright member 414 sliding loosely on a rod 416 and upheld by a spring 418. A pin 420 (Fig. 11) on the member 414, when the treadle 408 is depressed, engages an arm 422 on valve D to depress it until a surface 423 on the member is stopped by a fixed surface 424 on the frame, the movement of the valve D being only sufficient to connect the line 366 with the exhaust duct 404 and line 406 with the duct 474. During this movement of the member 414 the valve C is lifted by engagement of a pin 426 thereon with one end of a lever 428 having a fixed fulcrum 430 between its ends, the other end of the lever carrying a pin 431 lying under the head 360 of valve C so that when the loading station is dumped the pressurizing valve C will be returned to initial position.

Full depression of valve D is effected by depressing a knob 432 (Fig. 1) which has a downwardly extending stem 434 pivoted at 436 to a forwardly extending portion of a yoke 438 pivoted loosely on a shaft 440. The left-hand portion of the yoke 438 has a forwardly projecting arm pivoted at 442 to a link 444 connected at its lower end to an upwardly extending stem of valve D, the link being upheld by a tension spring 446 connected between a pin on the link and a pin 447 on the frame. A downward push on the knob 432 will therefore fully depress valve D which is held depressed by a latch 448 (Fig. 11) engaging the arm 422 which can be released by depressing the treadle 408, the latch being impelled toward the arm 422 by a spring 449. The latch 448 is fast to a rockshaft 450 mounted in a bracket 452 and having an arm 454 in the path of a lug 456 on the member 414 so that depression of the treadle 408 will release the latch 448 and allow the spring 446 to raise the valve D. Incidentally, if the pressurizing valve C is down, the lever 428 will be operated to lift it. Full depression of the knob exhausts all the ducts leading thereto (Fig. 16), that is, the line 366 to the loading station, the line 332 leading to the three cylinders under pressure, and the pressure in line 406 supplied to the left end of the cylinder 226 for indexing the turret. Thus, in case the operator is caught by the turret, or in any other emergency, the turret may be stopped and all pressures released.

The indexing valve E (Fig. 15) has a chamber E1 through which pressure fluid is supplied to the pressurizing valve C so that the loading station cannot be pressurized unless valve E is up. It has a chamber E2 which, upon depression of the valve, connects through a by-pass 461 a pressure line 356, 354 from pump P1 to the indexing cylinder 226 through a line 460 to port 246. A chamber E3, when the valve is raised, connects the line 460 to exhaust. When valve B is up, the chamber E4 surrounding a stem 462 on the valve E receives pressure from line 340 through B2 and line 342 to hold valve E raised until the loading station is pressurized and valve B depressed, whereupon chamber E4 is exhausted through line 342, chamber B3 and its exhaust duct 344, permitting valve E to be depressed. The stem 462 slides in a chamber E5 which is pressurized to lift valve E when the latch 272 is tripped, and pressure from the indexing cylinder 226 passes through the line 265 to the chamber E5 and through line 266 to the chamber B4, lifting valves B and E and exhausting the line 460 from the left end of the cylinder through E3 then connected to exhaust port 466. The indexing valve E is depressed by forward movement of a handle 467 fixed to the shaft 440 (Fig. 1) which has a forwardly projecting arm connected to a link 468 at the lower end of which is a lost-motion connection to the stem of valve E such that the valve E may remain down when the link 468 is raised by a tension spring 470 connected between a pin on the link and the fixed pin 447. If valve E is up, operation of the handle 467 will depress it unless it is held up by pressure in the chamber E4 and it is held yieldingly in up or down position by a spring detent 472.

Fig. 12 illustrates diagrammatically conditions with the motor running and the machine at rest. High pressure is supplied by P2 to maintain pressure in all the cylinders 60 except that at the loading station. This pressure is indicated in the pipe lines by short and long dash lines, the intermediate pressure (250 pounds per square inch) by long dash lines, and the low pressure (150 pounds per square inch) by short dash lines. Exhaust lines are vacant and lines in which the fluid is trapped are designated by long dashes crossed by short dashes.

In Fig. 12 pump P1 is idle, its line 356, 354 being exhausted through E1, line 352, C1 and port 350. Thus, the loading station cannot be pressurized unless the indexing valve is up. Pump P2 is maintaining high pressure in its line 332 which is stopped at D3, at A1 and at valve F and is connected by the pipe 92 to the groove 96 in the stationary valve member 64 by which pressure is maintained in three of the cylinders 60. The line 88 to the loading station has the connected line 366 stopped at D2, connected line 338 stopped at A4, and connected line 362 stopped at C. Connected line 370, however, is connected by a small orifice to the drain 382 in valve F so that pressure cannot build up in the trapped line connected to the cylinder 60 at the loading station. Through relief valve R3, pump P2 is supplying low pressure (150 pounds per square inch) to the cylinder 292, the piston of which presses on the lever 286, and to a line 340 leading to B2 and thence through line 342 to E4 to hold up valve E. A branch 471 from line 340 supplies, through the restricted passage 235 and port 232, pressure on the right end of the indexing piston 224.

Fig. 13 represents diagrammatically conditions resulting from depression of pressurizing valve C by the treadle 384. Exhaust line 350 being now cut off, pressure flows from P1 through C1, through line 362, through the check valve 364 and the line 88 to the loading station. Pressure in connected line 368 lifts valve F, connecting line 372 with 370. The valve A is now subjected on top to pressure from P2 through pipe 330 and on the bottom through pipe 338 to pressure from P1. In the line 356 from P1 is the check or relief valve R1 which is so set that the pressure from P1 will for a moment exceed, by a predetermined differential, the pressure from P2. When this occurs valve A is pushed up and connects chamber A1 through the duct 336 and chamber A3 to the ducts 334 and 335 respectively leading to the chamber B1 and the chamber C2 to push down valve B and lift valve C. In Fig. 13 valve C is just about to be pushed up to complete the pressurizing operation at the loading station. However, it will be seen that both the cylinder 60 at the loading station and the other three cylinders 60 are still receiving high pressure from pump P2 to prevent any loss of pressure therein should indexing be delayed.

If for any reason, such as misplacement of the shoe, it is desirable to release the pressure in the unit at the loading station before indexing, the treadle 408 is depressed to push down valve D part way (Fig. 14), that is, until member 414 engages the fixed stop 424. This movement of valve D is sufficient to connect line 366 through D1 with the exhaust passage 404, dumping the pressure at the loading station but maintaining it in the other three cylinders 60. The depression of the treadle 408 not only exhausted the loading station but operated the lever 428 to lift valve C so that when the treadle 408 is released the valve D will be raised by its spring 448 (Fig. 1) and the conditions of Fig. 12 restored.

When pressure application to the shoe is satisfactory, the turret is indexed by pulling forward the handle 467, thus pushing down on valve E and producing the conditions shown in Fig. 15 where the turret carrying the cylinders 60 has turned about 45° and the cylinder 60 at the left of the loading station is being exhausted through the duct 80. Since low-pressure line 340 is stopped at B2, pressure is maintained on the right end of the indexing piston 224 and valve 244 is held open. Since E is depressed, intermediate pressure in lines 356, 354 passes through E1 and a by-pass 461 through E2 to line 460 leading through valve 244 to the left end of the piston. Low pressure from the right end of the piston is passing through the slit 318, the groove 237 and the check valve 234 in line 471 to the line 340. At substantially the end of the movement of the indexing piston, one of the rolls 196 will reach the radial drop 303 and release the lever 286, allowing its actuation by the piston 290 to release the connection of the piston rod to the stud 198 with which it is engaged and to cause the roll 304 to engage the lever arm 308 and trip the latch 272. The valve 260 is then operated by its spring 267 to close the exhaust port 262 and connect the duct 251 leading from the left end of the indexing cylinder with the port 264 and the line 265 leading to E5 and the line 266 leading to B4. Thus, the indexing valve E and the sequence valve B are both lifted and the pressure line 460 is exhausted at E3 through exhaust port 466. The continuous pressure on the right end of the piston then takes effect to return the piston, whereupon the screw 310 engages the rod 314 (Fig. 8) to return the valve 260 to initial position to be held by the latch 272.

Conditions, when the dump valve D has been fully depressed by its knob 432 to be held by the latch 448 while the valve E is down, are shown in Fig. 16. The high-pressure line 32 is exhausted through D2, D1 and exhaust duct 404. The line 366 supplying pressure at the loading station S is exhausted through D1 and exhaust duct 404. The line 406 connected to lines 354, 356 supplying pressure fluid to the left end of the indexing piston is exhausted through D4 and an exhaust duct 474. The low pressure on the right end of the piston is lost because both pumps are open to exhaust. The fluid in line 362 is trapped between the check valve 364 and valve C and that in the connected line 338 is stopped at A4. The normal conditions of Fig. 12 are restored by depressing treadle 408 to release the latch 443, causing the spring 446 to lift the valve D.

Having thus described our invention, what we claim as new and desire to secure by Letters Patent of the United States is:

1. In a shoe machine, a conveyor, work-receiving units on the conveyor, a piston in a cylinder, the piston being connected to the conveyor to move it, means for supplying fluid under constant low pressure to one end of the piston and fluid under high pressure at the other end of the piston, and a spring-closed valve admitting high pressure to the piston, said valve being held open by the low pressure on the other end of the piston.

2. In a shoe machine, a conveyor, work-receiving units on the conveyor, a fluid motor for operating the conveyor, a source of fluid at low pressure connected to the motor opposing movement of the conveyor, a source of high-pressure fluid, and a spring-closed valve for controlling application of high-pressure fluid to the motor to move the conveyor, said valve being normally held open by the low pressure.

3. In a shoe machine, a conveyor, work-receiving units on the conveyor, a fluid motor for operating the conveyor, means for applying constant fluid pressure in the motor opposing movement of the conveyor, a source of high-pressure fluid, a valve for controlling application of high-pressure fluid to the motor to move the conveyor, and means for preventing admission of the high-pressure fluid to the motor unless the opposing pressure is effective to control movement of the motor.

4. In a shoe machine, a conveyor, work-receiving units on the conveyor, a piston in a cylinder, the piston being connected to the conveyor to move it, means for supplying fluid under constant pressure at one end of the piston and fluid under higher pressure at the other end of the piston to operate the piston, and means for gradually checking exit of the low-pressure fluid from the cylinder as the high-pressure fluid actuates the piston to move the conveyor.

5. In a shoe machine, a conveyor, work-receiving units on the conveyor, a piston in a cylinder, the piston being connected to the conveyor to move it, means for supplying fluid under constant low pressure to one end of the piston and fluid under high pressure to the other end of the piston, and a spring-pressed valve through which the high-pressure fluid passes to the cylinder, said valve being held open by the low pressure to permit passage of the high pressure.

6. In a machine for operating on shoes, a post, a link rotatable about the post, a turret rotatable about the post, a cylinder movable about a fixed axis, a piston in the cylinder, a piston rod connecting the piston to the free end of the link, a source of high-pressure fluid for operating the piston, a series of studs projecting down from the turret, means carried by the piston rod to engage one of the studs, a lever having a fixed fulcrum and a radial drop, said lever engaging another stud on the turret, fluid-pressure-operated means for holding the lever against the stud, and means connected to said lever and acting when the stud engaging the lever reaches the radial drop to disconnect the means carried by the piston rod from the stud which it engages.

7. A machine according to claim 6 having a spring-opened valve preventing when closed exit of high-pressure fluid from the cylinder, and a latch holding said valve closed, said lever acting to release the latch when it acts to release the piston rod from its stud.

8. In a machine for applying pressure to shoe bottoms, a conveyor, cylinder-and-piston pressure-applying units on the conveyor, a first pump for supplying fluid pressure to one of the units, a second pump for supplying pressure to all of the other units, and means operated by pressure applied to the one unit by the first pump for causing the second pump to be connected to the unit being pressurized by the first pump.

9. In a machine for applying pressure to shoe bottoms, a conveyor, fluid-pressure-operated pressure-applying units on the conveyor, first and second pumps for supplying pressure to said units, the second pump initially maintaining constant pressure in all the units except that at the loading station, the first pump supplying fluid at varying pressures to the unit at the loading station, a manually operated valve for causing pressure to be applied to the unit at the loading station by the first pump, means operated by said pressure for connecting the unit at the loading station to the second pump, and means operated by excess of pressure of the first pump over that of the second pump for terminating the application of pressure by the first pump while pressure from the second pump continues to be applied to the unit at the loading station.

10. In a machine for applying pressure to shoe bottoms, a turret, pads on the turret, fluid-pressure-operated units for pressing shoes on the pads presented in turn at a loading station by rotation of the turret, a first pump, a second pump, a relief valve common to the pumps set at high pressure, a relief valve connected to the first pump between it and the common relief valve to cause its pressure to exceed that of the second pump, means for connecting the second pump to all the units except that at the loading station, means for connecting the first pump to the unit at the loading station, a sequence control valve, a sequence valve, a pressurizing valve, and an indexing valve held closed by fluid pressure, operation of the pressurizing valve causing application of pressure to the unit at the loading station, pressure at that unit operating the sequence control valve to admit pressure to operate the sequence valve, and operation of the sequence valve relieving pressure on the indexing valve to permit its operation.

11. In a machine for applying pressure to shoe bottoms, the combination of a turret, pads on the turret, fluid-pressure-operated means for applying pressure to each shoe placed on a pad, the pads being presented in turn at a loading station by rotation of the turret, a pump capable of maintaining pressure at all of the fluid-operated means, a pump capable of supplying pressure in excess of that supplied by the first-mentioned pump, and means operated by the excess of pressure of one pump over that of the other pump for terminating application of pressure at the loading station by one of said pumps while pressure from the other pump continues to be applied at the loading station.

12. In a machine for applying pressure to shoe bottoms, the combination of a turret, pads on the turret, fluid-pressure-operated units for applying pressure to each shoe placed on a pad, the pads being presented in turn at a loading station by rotation of the turret, a pump for initially maintaining pressure on all of the fluid-operated units except the one at the loading station, a higher pressure pump capable of exceeding the pressure of the other pump and connected to the unit at the loading station, means operated by pressure of the higher pressure pump to connect the unit at the loading station to the first-mentioned pump, a slide valve subjected at one end to pressure from the first-mentioned pump and at the other end to pressure from the higher pressure pump, and a valve for initiating the action of the higher pressure pump, movement of the slide valve due to excess of pressure of one pump over that of the other pump opening a port to the initiating valve to close it while pressure of the first-mentioned pump at the loading station is maintained.

13. In a machine for applying pressure to shoe bottoms, the combination of a turret, pads on the turret presented in turn by rotation of the turret at a loading station, fluid-pressure-operated means for applying pressure to each shoe placed on a pad, a first source of fluid pressure in large volume for pressing the shoe at the loading station, a second source of low volume fluid at high pressure acting initially to maintain pressure on all of the shoes except that in the loading station, means for supplying fluid pressure from said second source to the shoe at the loading station, means for causing the pressure of the first source to exceed by a predetermined differential the pressure from the second source, and means operated by the difference in pressure from the two sources for cutting off the supply from the first source to the loading station while pressure from the second source is maintained thereon.

14. In a machine for applying pressure to shoe bottoms, the combination of a turret, pads on the turret, fluid-pressure-operated means for applying pressure to each shoe placed on a pad, the pads being presented in turn at a loading station by rotation of the turret, a pump for initially maintaining pressure at all of the fluid-operated means except the one at the loading station, another pump, and means for applying pressure from both pumps to the fluid-pressure-operated means at the loading station.

15. In a machine for applying pressure to shoe bottoms, a turret, fluid-pressure-applying units carried by the turret past a loading station, a pad for each unit, a fixed valve about which the turret rotates, and ducts in the valve connected to sources of fluid pressure and an exhaust duct in said valve, said turret having ducts leading to each pressure unit through ports so placed that a unit at the loading station receives pressure from one source while the other units receive pressure from another source, the passage of one of the units toward the loading station connecting it to the exhaust duct.

16. In a machine for applying pressure to shoe bottoms, the combination of a turret, pads on the turret, fluid-operated means for applying pressure to each shoe placed on one of the pads, a pump for initially maintaining pressure on all of the shoes except that on one of the pads, means for later connecting said pump to the pad not initially supplied, another pump for applying pressure to the shoe on said pad, and means operated by differential of pressure between the pumps for terminating application of pressure on the shoe by one of said pumps.

17. In a machine for applying pressure to shoe bottoms, the combination of a turret, pressure-applying units on the turret, an arm movable about the center of the turret, a stud on the turret for each pressure-applying unit, a cylinder mounted on a pivot, a piston and piston rod connected to said arm, means for connecting the piston rod to one of the studs, a source of fluid pressure constantly opposing movement of the piston, a manually operated valve for controlling application of fluid pressure to move the piston against said opposing pressure, and means controlled by rotation of the turret when said valve is opened for disconnecting said piston rod and closing said valve.

18. In a machine for applying pressure to shoe bottoms, the combination of a turret, fluid-operated pressure-applying units on the turret, studs on the turret corresponding in number to the units, a cylinder, a piston, a piston rod, means for connecting the piston rod to one of the studs, a source of fluid pressure for applying to one end of the piston a constant pressure opposing the movement of the piston in one direction, a source of higher pressure, and means for applying the higher pressure on the other end of the piston to turn the turret.

19. In a machine for applying pressure to shoe bottoms, the combination of a turret, fluid-operated pressure-applying units on the turret, studs on the turret corresponding in number to the units, a cylinder, a piston, a piston rod, means for connecting the piston rod to one of the studs, a source of fluid pressure for applying to one end of the piston a constant pressure opposing the movement of the piston in one direction, a source of higher pressure, means for applying the higher pressure on the other end of the piston to turn the turret, and a valve for controlling application of the high-pressure fluid to the cylinder held open by reason of low pressure on the other end of the piston whereby the turret cannot be indexed unless low pressure is effective to oppose movement of the turret.

20. In a machine for operating on shoes, the combination of a post, an arm rotatable about the post, a turret rotatable about the post, a cylinder movable about a fixed axis, a piston in the cylinder, a piston rod connecting said piston to the free end of the arm, a series of studs projecting down from the turret, a spring-sustained cup having a downwardly and outwardly inclined peripheral flange carried by the piston rod to engage one of the studs, a cam controlled by rotation of the turret due to pressure on the piston for engaging said flange to disengage the cup from its stud at the end of the piston stroke, a spring-opened valve preventing when closed exhaust of pressure from the cylinder, a latch holding said valve closed, and connections from said cam to said latch whereby movement of the cam to release the cup from the stud releases the latch to permit the valve to open and cause the cylinder to be exhausted.

21. A machine according to claim 20 having means operated by the return stroke of the piston to close said valve.

22. In a machine for operating on shoes, the combination of a post, an arm rotatable about the post, a turret rotatable about the post, a cylinder movable about a fixed axis, a piston in the cylinder, a piston rod connecting said piston to the free end of the arm, a series of studs projecting down from the turret, a spring-sustained cup having a downwardly and outwardly inclined peripheral flange carried by the piston rod to engage one of the studs, a cam controlled by rotation of the turret due to pressure on the piston for engaging said flange to disengage the cup from its stud at the end of the piston stroke, a valve movable from initial position to supply pressure fluid to said piston to index the turret, and means controlled by rotation of the turret for restoring said valve to initial position.

23. In a machine for applying pressure to shoe bottoms, the combination of a turret, pads on the turret, fluid-pressure-operated means for applying pressure to each shoe placed on a pad, the pads being presented in turn to a loading station by rotation of the turret, a pump capable of maintaining pressure on all of the fluid-operated means, a pump capable of supplying pressure in excess of that supplied by the first-mentioned pump, a pressurizing valve controlling the supply from the excess pressure pump to the loading station, and a slide valve operated by the excess of pressure of one pump over that of the other pump for closing the pressurizing valve.

24. In a machine for applying pressure to shoe bottoms, the combination of a turret, pressure-applying units on the turret, an arm movable about the center of the turret, a stud on the turret for each pressure-applying unit, a cylinder mounted on a fixed pivot, a piston, a piston rod connected to said arm, a cup on the piston rod for connecting it to one of the studs, a source of fluid pressure constantly opposing movement of the piston, a second source of fluid pressure, a manually operated valve operable to permit flow of fluid pressure from the second source to move the piston against said opposing pressure, a lever having a fixed fulcrum and having a cam-shaped edge engaged by said studs in turn, fluid-pressure-operated means for pressing the lever toward the studs, a rotary cam on a fixed axis adjacent to said cup when it is at the end of the piston stroke, a link connecting said lever to the rotary cam, said lever having a radial drop in its edge face whereby when a stud moves beyond said drop the rotary cam is actuated to detach the cup from the stud, a spring-opened valve controlling exhaust of fluid from the high-pressure end of the cylinder, a latch for holding the spring-opened valve closed, and means operated by said lever for releasing the latch to allow the spring-opened valve to open and cause exhaust of the high-pressure end of the cylinder.

25. A machine according to claim 24 having means by which the higher pressure released from the cylinder is utilized to restore the manually operated valve to initial position.

26. In a machine for applying pressure to shoe bottoms, the combination of a turret, pressure-applying units on the turret, studs on the turret corresponding in number to the units, a cylinder, a piston, a piston rod, means connecting the piston rod to one of the studs, a source of fluid pressure for applying to one end of the piston a constant low pressure opposing movement of the piston in one direction, a source of higher pressure, an indexing valve movable from initial position to admit higher pressure to the piston to turn the turret, fluid-pressure means for holding the indexing valve against movement, and a sequence valve for releasing the holding pressure on the indexing valve when all the units have been pressurized.

27. A machine according to claim 26 having means controlled by rotation of the turret and operated at the end of its movement to restore the indexing valve to initial position and exhaust the high pressure in the cylinder.

28. A machine according to claim 26 having a valve between the indexing valve and the cylinder for controlling entrance of high-pressure fluid to the cylinder, the valve being closed by a spring and held open by the low pressure on one end of the piston.

29. In a machine for cement-attaching soles to shoes, the combination of a pad to receive a shoe to be pressed, an abutment to engage the forepart of the shoe, an abutment to engage the cone of a last in the shoe, means for guiding the abutments in vertical directions, springs one for each abutment tending to raise it, a pressure lever fulcrumed between its ends for depressing each abutment, a distributing lever between the pressure levers, a fluid-operated piston acting on the mid portion of the distributing lever to raise it, auxiliary springs one for each abutment tending to raise it, and means for varying the tension of the auxiliary springs whereby when the piston is operated either of the abutments may be made to approach the shoe ahead of the other.

30. In a machine for applying pressure to shoe bottoms, the combination of a turret, pads on the turret, fluid-pressure-operated units for pressing shoes on the pads presented in turn at a loading station by rotation of the turret, a first pump, a second pump, a relief valve common to the pumps set at high pressure, a relief valve connected to the first pump between it and the common relief valve to cause its pressure to exceed that of the second pump, means for connecting the second pump to all of the units except that at the loading station, means for connecting the first pump to the unit at the loading station, a first valve controlling supply of fluid from the first pump to the unit at the loading station, and a second valve operated by the excess of pressure produced by the first pump over that of the second pump for causing application of fluid pressure to the first valve to close it.

31. In a machine for applying pressure to shoe bottoms, the combination of a turret, pads on the turret, fluid-pressure-operated units for pressing shoes on the pads presented in turn at a loading station by rotation of the turret, a first pump, a second pump, a relief valve common to the pumps set at high pressure, a relief valve connected to the first pump between it and the common relief valve to cause its pressure to exceed that of the second pump, means for connecting the second pump initially to all of the units except that at the loading station, means for connecting the first pump to the unit at the loading sation, a first valve controlling a supply of fluid from the first pump to the unit at the loading station, a second valve operated by pressure of the first pump to connect the loading station with the second pump, and a third valve operated by excess of pressure produced by the first pump over that of the second pump for causing application of fluid pressure to the first valve to close it, the second pump remaining connected to the loading station through said second valve to maintain pressure at the loading station until the turret is indexed.

32. In a machine for applying pressure to shoes, the combination of a turret, pads on the turret, fluid-pressure-operated means for applying pressure to each shoe placed on a pad at a loading station, and a slide valve for dumping the pressure of all of said fluid-pressure-operated means.

33. In a machine for applying pressure to shoes, the combination of a turret, pads on the turret, fluid-pressure-operated means for applying pressure to each shoe placed on a pad at a loading station, a slide valve connected to the fluid-pressure-operated means at the loading station, and a treadle connected to said valve and operable to exhaust the pressure on the fluid-pressure-operated means at the loading station.

34. In a machine for applying pressure to shoes, the combination of a turret, pads on the turret, fluid-pressure-operated means for applying pressure to each shoe placed on a pad at a loading station, fluid-pressure-operated means for indexing the turret, and a manually operated slide valve for exhausting the pressure in all of said fluid-pressure-operated means.

35. In a machine for applying pressure to shoes, the combination of a turret, pads on the turret, fluid-pressure-operated means for applying pressure to each shoe placed on the pad at the loading station, and a valve partial movement of which releases pressure on the shoe at the loading station and full movement of which releases pressure on all the shoes.

36. In a machine for applying pressure to shoes, the combination of a turret, pads on the turret, fluid-pressure-operated means for applying pressure to each shoe placed on a pad at a loading station, fluid-pressure-operated means for indexing the turret, means for maintaining predetermined pressure in all of said fluid-pressure-operated shoe-pressing means, and a single valve operable to exhaust the pressure in all of said fluid-pressure-operated means including that for indexing the turret.

37. In a machine for cement-attaching soles to shoes, the combination of a pad to receive a shoe to be pressed, an abutment to engage the forepart of the shoe, an abutment for the cone of a last in the shoe, means for guiding the abutments in vertical directions, a pair of levers fulcrumed between their ends operatively connected one to each abutment at its forward end, the rear ends of the levers having cylindrical holes, a dumbbell having rounded ends engaging the cylindrical holes, a block in which said dumbbell is pivoted between its ends, a piston on which said block rests, and means for applying fluid pressure to said piston.

38. In a machine for applying pressure to shoe bottoms, the combination of a turret, pads on the turret, fluid-pressure-operated means for applying pressure to a shoe on each pad as it is presented by rotation of the turret at an operating station, fluid-pressure-operated means for indexing the turret, a manually operated valve for controlling a supply of pressure fluid to said indexing means, means normally holding said valve against manual operation, and means dependent on pressurizing of the fluid-pressure-operated means at the loading station for relieving said valve to permit its manual operation.

39. In a machine for applying pressure to shoe bottoms, the combination of a turret, pads on the turret, fluid-pressure-operated units for pressing shoes on the pads presented in turn at a loading station by rotation of the turret, a piston in a cylinder for rotating the turret, a source of constant fluid pressure, a source of variable fluid pressure which may exceed the constant pressure, means for maintaining pressure from the constant pressure source in all but one of said units and low pressure on one end of the piston, means for applying pressure from the source of variable fluid pressure to the unit at the loading station, valve means operated by the excess of pressure from one source over that of the other for terminating pressurizing of the unit at the loading, station and means for applying, from said variable source, pressure on the other end of the piston to operate it.

40. In a machine for applying pressure to shoe bottoms, the combination of a turret, pads on the turret, fluid-pressure-operated units for pressing shoes on the pads presented in turn at a loading station by rotation of the turret, a piston and a cylinder for rotating the turret, a source of constant fluid pressure, a source of variable fluid pressure which may exceed the constant pressure, means for maintaining pressure from the constant pressure source in all but one of said units and low pressure on one end of the piston, means for applying pressure from both the constant and the variable fluid pressure sources to the unit at the loading station, an automatic valve operated by the excess of pressure from one source over that of the other for terminating pressurizing of the unit at the loading station from the variable source, means for applying, from said variable source, pressure on the other end of the piston to operate it, valve means for admitting said pressure to the piston, and means preventing operation of said valve means until the loading station is pressurized.

41. In a machine for applying pressure to shoe bottoms, the combination of a turret, pads on the turret, fluid-pressure-operated units for pressing shoes on the pads presented in turn at a loading station by rotation of the turret, a piston in a cylinder for rotating the turret, a source of constant fluid pressure, a source of variable fluid pressure, means for maintaining pressure from the constant pressure source in all but one of said units and low pressure on one end of the piston, means for applying pressure from the source of variable fluid pressure to the unit at the loading station, a relief valve for causing pressure from the variable source to exceed that from the constant pressure source, an automatic valve operated by said excess of pressure for terminating pressurizing of the unit at the loading station, and means for applying, from said variable source, pressure on the other end of the piston to index the turret.

42. In a machine for applying pressure to shoe bottoms, the combination of a turret, pads on the turret, fluid-pressure-operated units for pressing shoes on the pads presented in turn at a loading station by rotation of the turret, a piston in a cylinder for rotating the turret, a source of constant fluid pressure, a source of variable fluid pressure, a relief valve for causing the pressure from the variable source to exceed that from the constant pressure source, pressure from said constant pressure source being initially applied to all the units except that at the loading station, means for conducting low pressure from said constant pressure source to one end of the piston, a pressurizing valve for admitting pressure fluid from the variable source to the unit at the loading station, means controlled by pressure from the variable source for connecting the unit at the loading station to the constant pressure source, a sequence control valve operated by excess of pressure from the variable source over that from the constant pressure source for closing the pressurizing valve, an indexing valve held closed by the low pressure on the piston, a sequence valve operated by the sequence control valve for releasing the pressure on the indexing valve, manual means for opening the indexing valve to admit intermediate pressure from said variable source to said cylinder at the end opposite that to which low pressure is applied to cause indexing of the turret, and means controlled by rotation of the turret for causing the indexing valve to close.

References Cited in the file of this patent

UNITED STATES PATENTS

| | | |
|---|---|---|
| 596,830 | Rodgers | Jan. 4, 1898 |
| 1,130,918 | Miller | Mar. 9, 1915 |
| 2,047,185 | Ballard et al. | July 14, 1936 |
| 2,174,569 | Dinzl | Oct. 3, 1939 |
| 2,319,274 | Stratton | May 18, 1943 |
| 2,445,848 | Finn | July 27, 1948 |
| 2,486,988 | Schafer et al. | Nov. 1, 1949 |
| 2,540,117 | Hunt | Feb. 6, 1951 |
| 2,560,475 | Rehnberg et al. | July 10, 1951 |